(12) United States Patent
Ouzieli et al.

(10) Patent No.: US 11,812,361 B2
(45) Date of Patent: Nov. 7, 2023

(54) ENHANCED BEACON FRAMES IN WIRELESS COMMUNICATIONS

(71) Applicants: Intel Corporation, Santa Clara, CA (US); Intel IP Corporation, Santa Clara, CA (US)

(72) Inventors: Ido Ouzieli, Tel Aviv (IL); Emily Qi, Gig Harbor, WA (US); Stanislav Gens, Nazareth Illit (IL); Robert Stacey, Portland, OR (US); Izoslav Tchigevsky, Haifa (IL)

(73) Assignee: Intel Corporation, Santa Clara, CA (US)

( * ) Notice: Subject to any disclaimer, the term of this patent is extended or adjusted under 35 U.S.C. 154(b) by 33 days.

(21) Appl. No.: 17/195,376

(22) Filed: Mar. 8, 2021

(65) Prior Publication Data

US 2021/0195497 A1 Jun. 24, 2021

Related U.S. Application Data

(63) Continuation of application No. 16/290,107, filed on Mar. 1, 2019, now abandoned.

(Continued)

(51) Int. Cl.
*H04W 4/00* (2018.01)
*H04W 40/24* (2009.01)
(Continued)

(52) U.S. Cl.
CPC ....... *H04W 40/244* (2013.01); *H04L 63/1466* (2013.01); *H04W 12/106* (2021.01);
(Continued)

(58) Field of Classification Search
CPC ............ H04W 40/244; H04W 12/106; H04W 12/108; H04W 12/122; H04W 84/12; H04L 63/1466
(Continued)

(56) References Cited

U.S. PATENT DOCUMENTS

| 10,735,960 B2 * | 8/2020 | Huang .............. H04W 52/0229 |
| 2012/0213184 A1 * | 8/2012 | Choi ..................... H04W 8/186 |
| | | 370/329 |

(Continued)

OTHER PUBLICATIONS

Srdjan Čapkun;Mario Čagalj;Ramkumar Rengaswamy; Ilias Tsigkogiannis;Jean-Pierre Hubaux;Mani Srivastava; "Integrity Codes: Message Integrity Protection and Authentication over Insecure Channels"; IEEE Transactions on Dependable and Secure Computing. Year: 2008 | vol. 5, Issue: 4 (Year: 2008).*

(Continued)

*Primary Examiner* — Thai D Hoang
(74) *Attorney, Agent, or Firm* — Eversheds Sutherland (US) LLP

(57) ABSTRACT

This disclosure describes systems, methods, and devices related to using protected beacon frames in wireless communications. A device may determine a beacon management element of a beacon frame body and may determine an integrity group key identifier of the beacon management element, wherein the integrity group key identifier is associated with a basic service set (BSS). The device may determine, based on the integrity group key identifier, a management integrity check (MIC) field of the beacon management element. The device may generate a beacon frame including the beacon frame body. The device may send the beacon frame.

17 Claims, 11 Drawing Sheets

Related U.S. Application Data

(60) Provisional application No. 62/724,742, filed on Aug. 30, 2018, provisional application No. 62/691,860, filed on Jun. 29, 2018, provisional application No. 62/662,444, filed on Apr. 25, 2018, provisional application No. 62/658,078, filed on Apr. 16, 2018, provisional application No. 62/646,473, filed on Mar. 22, 2018, provisional application No. 62/637,537, filed on Mar. 2, 2018.

(51) Int. Cl.
  *H04L 9/40* (2022.01)
  *H04W 12/106* (2021.01)
  *H04W 12/108* (2021.01)
  *H04W 12/122* (2021.01)
  *H04W 84/12* (2009.01)

(52) U.S. Cl.
  CPC ....... *H04W 12/108* (2021.01); *H04W 12/122* (2021.01); *H04W 84/12* (2013.01)

(58) Field of Classification Search
  USPC ................................................ 370/335–348
  See application file for complete search history.

(56) References Cited

U.S. PATENT DOCUMENTS

| | | | |
|---|---|---|---|
| 2015/0003607 A1* | 1/2015 | Choi | H04L 63/065 380/44 |
| 2018/0063788 A1* | 3/2018 | Yang | H04W 12/108 |
| 2019/0007904 A1* | 1/2019 | Asterjadhi | H04W 52/54 |
| 2019/0208470 A1* | 7/2019 | Asterjadhi | H04L 69/22 |
| 2019/0268847 A1* | 8/2019 | Asterjadhi | H04W 52/0229 |
| 2019/0319745 A1* | 10/2019 | Pan | H04L 1/0061 |
| 2020/0015164 A1* | 1/2020 | Asterjadhi | H04W 52/0229 |
| 2020/0245137 A1* | 7/2020 | Chitrakar | H04W 52/0219 |
| 2020/0288397 A1* | 9/2020 | Ahn | H04W 52/0229 |
| 2023/0148178 A1* | 5/2023 | Chitrakar | H04L 9/0833 713/170 |

OTHER PUBLICATIONS

Park Ji-yong;Mi-sun Ryu;Jung Eui Suk;Seol Dong-Min;Hong-Shik Park; "An integrated security mechanism for network coding combining confidentiality and integrity"; 2009 11th International Conference on Advanced Communication Technology Year: 2009 | vol. 01 (Year: 2009).*

* cited by examiner

ENHANCED BEACON FRAMES IN WIRELESS COMMUNICATIONS

CROSS-REFERENCE TO RELATED APPLICATIONS

This application is a continuation of U.S. Non-Provisional application Ser. No. 16/290,107, filed Mar. 1, 2019, which claims the benefit of U.S. Provisional Application No. 62/637,537, filed Mar. 2, 2018, U.S. Provisional Application No. 62/646,473, filed Mar. 22, 2018, U.S. Provisional Application No. 62/658,078, filed Apr. 16, 2018, U.S. Provisional Application No. 62/662,444, filed Apr. 25, 2018, U.S. Provisional Application No. 62/691,860, filed Jun. 29, 2018, and U.S. Provisional Application No. 62/724,742, filed Aug. 30, 2018, the disclosures of which are incorporated by reference as if set forth in full.

TECHNICAL FIELD

This disclosure generally relates to systems and methods for wireless communication, and more particularly to beacon frame protection.

BACKGROUND

Wireless devices are becoming widely prevalent and are increasingly communicating with other wireless devices. Protocols and standards are needed to protect wireless communication. The Institute of Electrical and Electronics Engineers (IEEE) continues to develop standards to define wireless communications.

DETAILED DESCRIPTION

Figure 1:
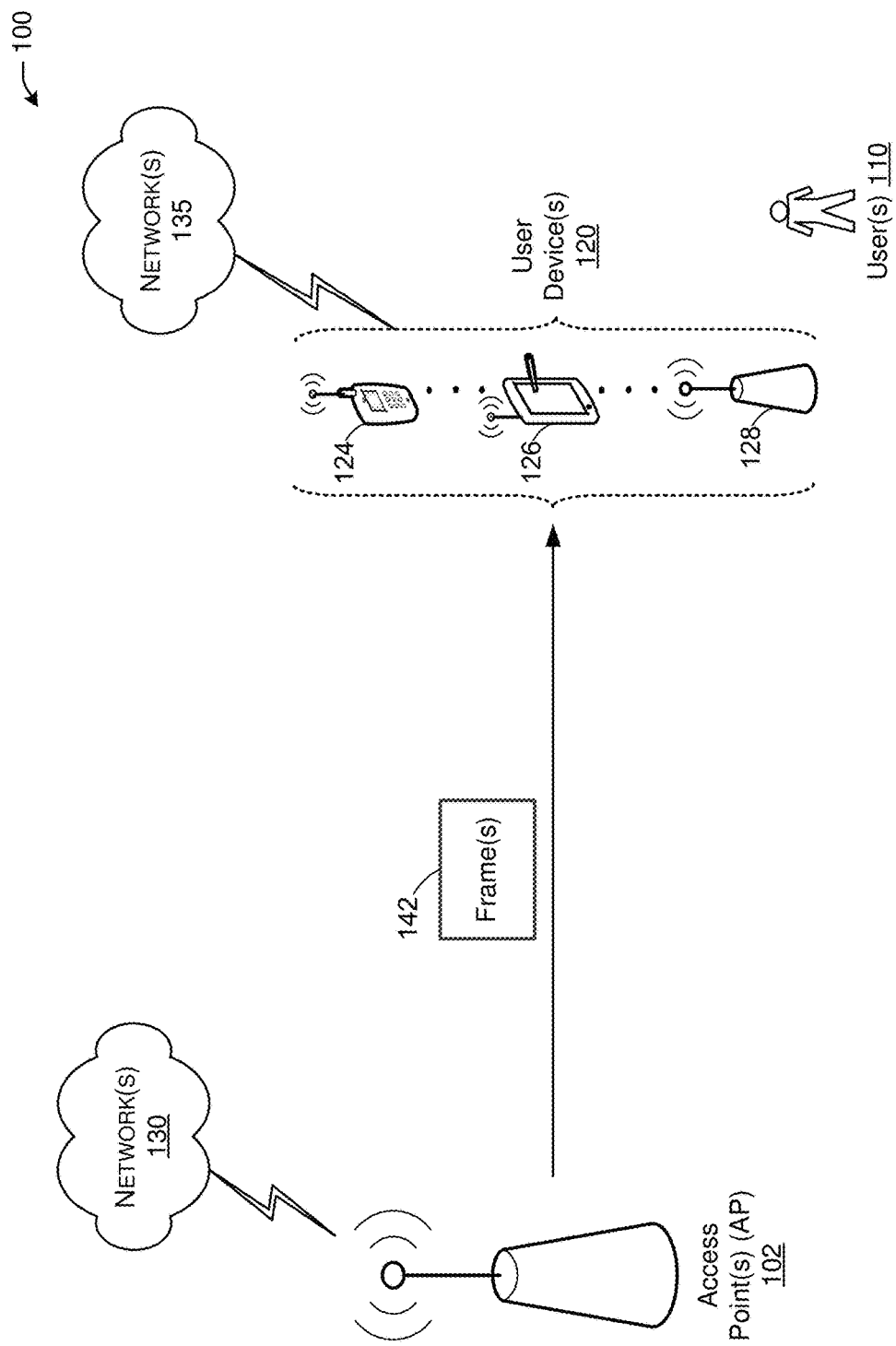
FIG. 1 is a network diagram illustrating an example network environment, in accordance with one or more example embodiments of the present disclosure.

The following description and the drawings sufficiently illustrate specific embodiments to enable those skilled in the art to practice them. Other embodiments may incorporate structural, logical, electrical, process, algorithm, and other changes. Portions and features of some embodiments may be included in, or substituted for, those of other embodiments. Embodiments set forth in the claims encompass all available equivalents of those claims.

Wireless local area networks (WLAN) may be implemented using Wi-Fi protocols defined by the IEEE 802.11 family of technical standards. WLANs may include multiple devices such as access points (AP) and stations (STA), which may send a variety of frames to one another. The frames may include management frames, control frames, data frames, and other types of frames. Management frames may include authentication request/response frames, association request/response frames, beacon frames, deauthentication frames, disassociation frames, probe request/response frames, reassociation request/response frames, and action frames.

Beacon frames are sent periodically from an AP and may announce the presence of a network provided by the AP. Beacon frames may provide information to STAs in a basic service set (BSS), which may include one or more STAs connected to a wireless network hosted by an AP. The information in a beacon frame may include BSS capability, supported rates and operating channel information, network information, traffic indication map (TIM), and a Time Synchronization Factor (TSF), among other information. Beacon frames are typically sent at fixed intervals (e.g., a beacon interval may refer to a time between respective beacons sent by an AP to a BSS). Beacon frames typically include a header, a body, and a frame check sequence (FCS) (e.g., for error detection). A beacon frame also may include additional information described in greater detail below.

An AP may transmit beacons to associated STAs (i.e., STAs that are already members of the BSS). The beacons contain information including AP capabilities and different modes of operation (e.g., transmit (TX) and receive (RX) rates). The Beacon may notify the STAs of planned changes (e.g., when the AP plans to switch a BSS to another channel).

The beacon frame may be received by associated STAs (e.g., STAs which already negotiated security keys with the AP after association) and also may be received by non-associated STAs (e.g., STAs which have not associated with a BSS of the AP and therefore have no security keys are set with the AP). Accordingly, beacons may be transmitted over the air in a non-protected mode, (i.e. they are not encrypted and thus lack integrity check mechanisms). The lack of beacon encryption may allow non-associated STAs to identify beacons from APs and determine available networks to which the STAs may associate. For example, if beacons were encrypted and included an encryption key, a non-associated STA who is unaware of the encryption key used by the AP sending the beacon may not be able to process the beacon.

Due to the lack of beacon security protection, devices may be exposed to attacks such as man-in-the-middle (MIM) attacks in which an imposter device may transmit beacon frames to the STAs as if they were coming from the real AP. For example, a MIM attacker may generate a beacon which mimics beacons sent from an AP because the MIM attacker may have access to the information in a beacon frame sent by the AP. An MIM attacker may send a beacon frame to an STA and cause the STA to change behavior (e.g., to change channels) when the AP is not actually implementing that behavior. Some Wi-Fi communications do not protect the beacon frame from such MIM attacks. While a robust security network element (RSNE) may be included in messages between the AP and STA during authentication and association, for example, beacon frame protection against forgery may not be prevented after association. While a broadcast/multicast integrity protocol (BIP) may provide protection for group-addressed management frames, beacon frames may not include such protection. As such, an attacker may impersonate the AP and transmit imposter beacon frames that cause the STA to change its behavior in such a manner that may result in disconnections and channel switching, for example. A forged TIM may result in STAs failing to wake up to receive frames sent by an AP or to wake up and waste battery life when the AP does not intend to send anything to the STAs. Similarly, forged TSF may result in STAs unable to receive group addressed frames.

In multiple BSS environments, APs may use multiple virtual APs (e.g., logical APs which behave as separate APs, but are part of the same physical AP) to facilitate multiple BSSs. Because any BSS may use one or more identifiers (e.g., for encrypted transmissions), when an AP intends to send frames (e.g., management frames) to multiple BSSs, the virtual APs may have to send separate management frames for the respective BSSs.

Therefore, wireless devices may benefit from a protected beacon frame which does not prevent non-associated STAs from processing information in the beacon and which may reduce the number of transmissions needed in multiple BSS environments.

Example embodiments of the present disclosure relate to systems, methods, and devices for protected beacons.

In one or more embodiments, an AP may generate a protected beacon frame to avoid MIM attacks while allowing both associated and non-associated STAs to receive and process the protected beacon frame. The AP may determine a beacon management element of a beacon frame body. For example, a beacon frame may include a beacon frame body. An enhanced beacon frame with security protection may be backwards compatible with legacy devices by including a beacon management element or another type of element in the beacon body, thereby including the new element in the structure of a beacon frame known to legacy devices. The AP may determine a security key such as an integrity group key (IGK), and may include the security key in the beacon management element. The security key may be specific to and associated with a BSS. For example, any BSS may have a respective security key included in the beacon body of a beacon frame. The AP my determine a management integrity check (MIC) of the beacon management element based on the security key and/or other information included in the new element added to the beacon frame body. The AP may generate a beacon frame including the beacon frame body and may send the beacon frame.

In one or more embodiments, the beacon frame may be received by one or more STAs, which may process and use information contained in the beacon frame to determine whether the beacon was sent by the real AP or a MIM imposter AP. If the STA determines that the received beacon frame is received from the real AP, the STA may continue processing the beacon and may behave according to the information in the beacon frame. However, if the STA determines that the beacon frame is received from an imposter AP (e.g., a MIM attack), the STA may discard the beacon frame and may send an indication to the AP that the STA received an invalid beacon frame. To determine whether the beacon frame is valid, the STA may determine an expected management integrity check (MIC) value based on information in the beacon management element in the beacon frame body. If the expected MIC value matches the information in the MIC field of the beacon management element, the STA may determine that the beacon frame is valid. If the expected MIC value does not match the information in the MIC field of the beacon management element, the STA may determine that the beacon frame is not valid.

In one or more embodiments, a protected beacon frame may utilize cipher-based message authentication code (CMAC) and Galois message authentication code (GMAC) cipher suites with the IGK to form the MIC field of the beacon management element. The MIC may be added at the end of the beacon management element and before the FCS of a beacon frame. The MIC may allow the STAs to verify that the beacon was transmitted by the AP and was not manipulated in a MIM attack.

In one or more embodiments, the STA may use a wireless network management (WNM) Notification Request frame to report a detected forged or bad beacon to the AP. The AP may take responsive action to mitigate the MIM attack.

In one or more embodiments, the protected beacon system may facilitate backward compatibility for legacy APs and legacy STAs. APs may signal their capabilities using a beacon protection bit in a robust security network (RSN) capabilities field of a RSN element (RSNE) of a management frame. For example, the AP may use a simple activated/not-activated bit in the RSN capabilities field. Legacy APs may indicate "not-activated" while non-legacy APs can indicate "activated."

STAs supporting beacon protection in a BSS may include beacon MIC protection. Associated legacy STAs that lack support for the protected beacon system may still receive and utilize the protected beacon despite any inability to utilize all of the protective features provided thereby. In an embodiment, a protected beacon frame may include the MIC through a dedicated information element (IE). STAs that do not support the dedicated IE may skip the IE while processing the beacon frame.

In one or more embodiments, a BSS may be one of multiple BSSs in a multiple BSS identifier (BSSID) set associated with a single physical AP. For example, some AP devices support multiple virtual APs (VAPs) that may transmit a single beacon frame to multiple BSSs of the VAPs. The multiple BSSID beacon frame may be received and processed by any STAs associated with any one or more of the VAPs in the multiple BSSID set. For example, STAs associated with VAP1 and STAs associated with VAP2 may receive and process the same multiple BSSID beacon. However, respective BSSs may use their own IGKs, the MIC may be universally verified by all STAs if using an IGK specific to the transmitted BSSID (e.g., the BSSID associated with the VAP which has sent a frame to multiple BSSs). Accordingly, in an embodiment, a protected beacon frame may include a multiple basic service set integrity group key (MultiBssIGK) shared by any VAPs of the multiple BSSID set. The MultiBssIGK may be a key that is additional to the respective key used by a BSS, and may be provided by an AP to any BSSs of the AP. STAs associated with VAP1 and STAs associated with VAP2 may receive and use the MultiBssIGK to verify the MIC, thereby avoiding the need to send separate beacon frames to multiple BSSs of an AP.

Beacon frames may include a timestamp. However, inclusion of the beacon timestamp in the MIC calculation may require hardware changes, thereby resulting in delaying the implementation of beacon protection. Without such hardware changes, the beacon timestamp may either be excluded from the MIC altogether, leaving the beacon timestamp unprotected, potentially resulting in a forged timestamp, or partially included in the MIC calculation.

The above descriptions are for purposes of illustration and are not meant to be limiting. Numerous other examples, configurations, processes, algorithms, etc., may exist, some of which are described in greater detail below. Example embodiments will now be described with reference to the accompanying figures.

FIG. 1 is a network diagram illustrating an exemplary network environment, according to some example embodiments of the present disclosure. Wireless network 100 may include one or more user devices 120 and one or more access points(s) (AP) 102, which may communicate in accordance with IEEE 802.11 communication standards. The user device(s) 120 may be mobile devices that are non-stationary (e.g., not having fixed locations) or may be stationary devices.

Figure 5:
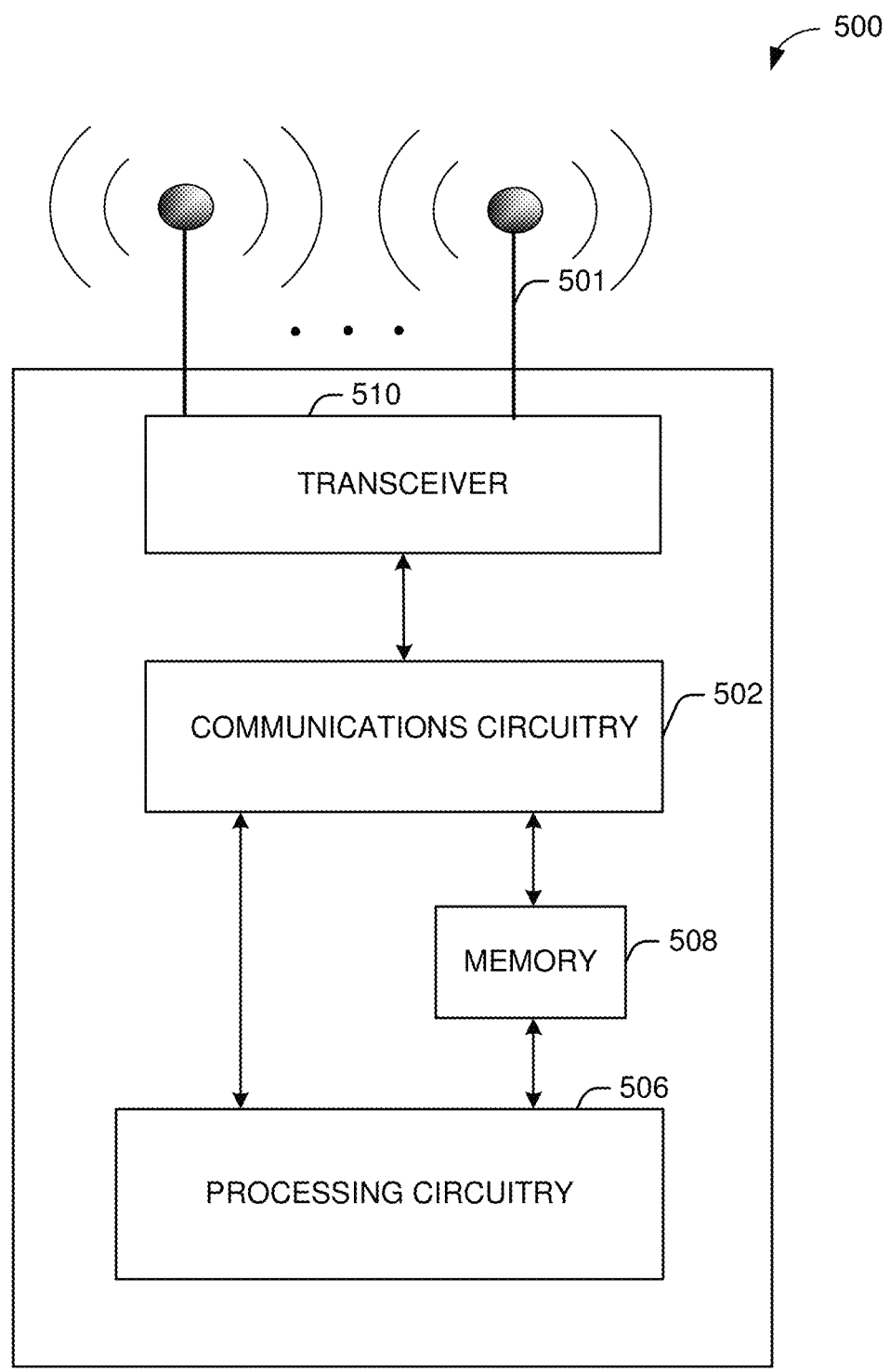
FIG. 5 illustrates a functional diagram of an exemplary communication station that may be suitable for use as a user device, in accordance with one or more example embodiments of the present disclosure.
Figure 6:
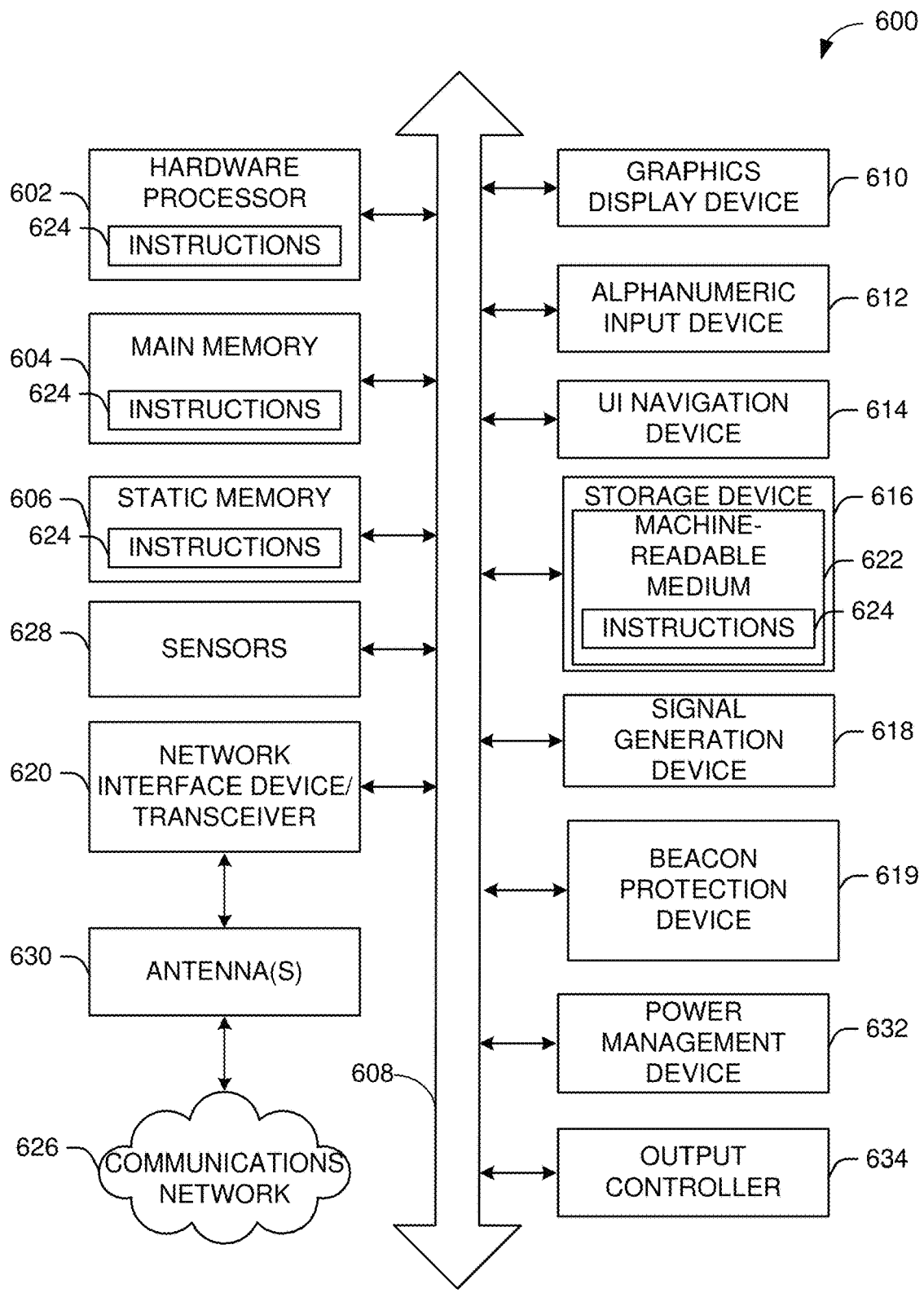
FIG. 6 illustrates a block diagram of an example machine upon which any of one or more techniques (e.g., methods) may be performed, in accordance with one or more example embodiments of the present disclosure.

In some embodiments, the user devices 120 and the AP 102 may include one or more computer systems similar to that of the functional diagram of FIG. 5 and/or the example machine/system of FIG. 6.

One or more illustrative user device(s) 120 and/or AP(s) 102 may be operable by one or more user(s) 110. It should be noted that any addressable unit may be a station (STA). An STA may take on multiple distinct characteristics, each of which shape its function. For example, a single addressable unit might simultaneously be a portable STA, a quality-of-service (QoS) STA, a dependent STA, and a hidden STA. The one or more illustrative user device(s) 120 and the AP(s) 102 may be STAs. The one or more illustrative user device(s) 120 and/or AP(s) 102 may operate as a personal basic service set (PBSS) control point/access point (PCP/AP). The user device(s) 120 (e.g., 124, 126, or 128) and/or AP(s) 102 may include any suitable processor-driven device including, but not limited to, a mobile device or a non-mobile (e.g., a static) device. For example, user device(s) 120 and/or AP(s) 102 may include, a user equipment (UE), a station (STA), an access point (AP), a software enabled AP (SoftAP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

As used herein, the term "Internet of Things (IoT) device" is used to refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

The user device(s) 120 and/or AP(s) 102 may also include mesh stations in, for example, a mesh network, in accordance with one or more IEEE 802.11 standards and/or 3GPP standards.

Any of the user device(s) 120 (e.g., user devices 124, 126, 128), and AP(s) 102 may be configured to communicate with each other via one or more communications networks 130 and/or 135 wirelessly or wired. The user device(s) 120 may also communicate peer-to-peer or directly with each other with or without the AP(s) 102. Any of the communications networks 130 and/or 135 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 120 (e.g., user devices 124, 126, 128) and AP(s) 102 may include one or more communications antennas. The one or more communications antennas may be any suitable type of antennas corresponding to the communications protocols used by the user device(s) 120 (e.g., user devices 124, 126 and 128), and AP(s) 102. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, omnidirectional antennas, quasi-omnidirectional antennas, or the like. The one or more communications antennas may be communicatively coupled to a radio component to transmit and/or receive signals, such as communications signals to and/or from the user devices 120 and/or AP(s) 102.

Any of the user device(s) 120 (e.g., user devices 124, 126, 128), and AP(s) 102 may be configured to perform directional transmission and/or directional reception in conjunction with wirelessly communicating in a wireless network. Any of the user device(s) 120 (e.g., user devices 124, 126, 128), and AP(s) 102 may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of the user device(s) 120 (e.g., user devices 124, 126, 128), and AP(s) 102 may be configured to perform any given directional transmission towards one or more defined transmit sectors. Any of the user device(s) 120 (e.g., user devices 124, 126, 128), and AP(s) 102 may be configured to perform any given directional reception from one or more defined receive sectors.

MIMO beamforming in a wireless network may be accomplished using RF beamforming and/or digital beamforming. In some embodiments, in performing a given MIMO transmission, user devices 120 and/or AP(s) 102 may be configured to use all or a subset of its one or more communications antennas to perform MIMO beamforming.

Any of the user devices 120 (e.g., user devices 124, 126, 128), and AP(s) 102 may include any suitable radio and/or transceiver for transmitting and/or receiving radio frequency (RF) signals in the bandwidth and/or channels corresponding to the communications protocols utilized by any of the user device(s) 120 and AP(s) 102 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g., 802.11b, 802.11g, 802.11n, 802.11ax), 5 GHz channels (e.g., 802.11n, 802.11ac, 802.11ax), or 60 GHZ channels (e.g., 802.11ad, 802.1 lay). 800 MHz channels (e.g., 802.11ah). The communications antennas may operate at 28 GHz and 40 GHz. It should be understood that this list of communication channels in accordance with certain 802.11 standards is only a partial list and that other 802.11 standards may be used (e.g., Next Generation Wi-Fi, or other standards). In some embodiments, non-Wi-Fi protocols may be used for communications between devices, such as Bluetooth, dedicated short-range communication (DSRC), Ultra-High Frequency (UHF) (e.g., IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

In one embodiment, and with reference to FIG. 1, AP 102 may communicate with one or more user devices 120. The AP 102 and the one or more user devices 120 may exchange one or more frames 142. The one or more frames may include management frames, such as beacon frames or other management frames, other downlink frames, uplink frames, or other types of frames.

It is understood that the above descriptions are for purposes of illustration and are not meant to be limiting.

Figure 2A:
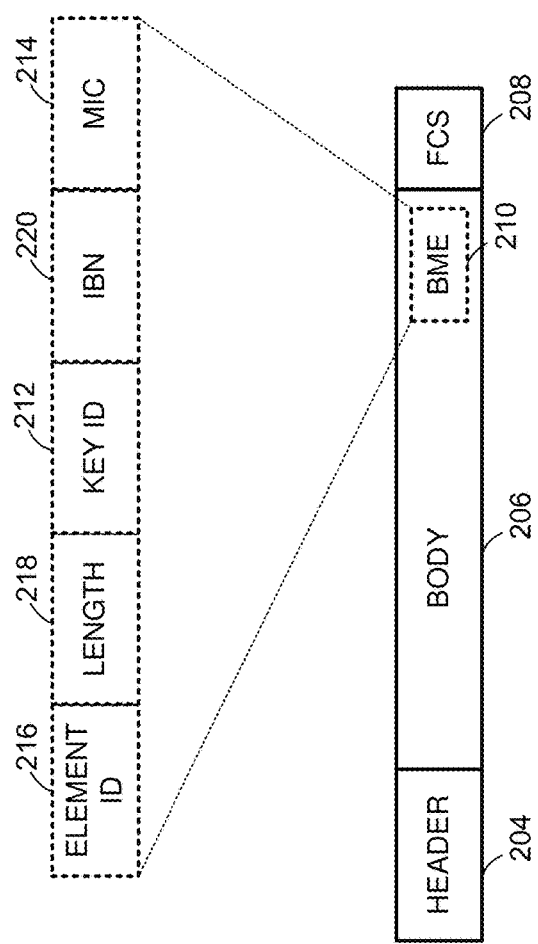
FIG. 2A depicts an illustrative portion of a protected beacon frame, in accordance with one or more example embodiments of the present disclosure.

FIG. 2A depicts an illustrative portion 200 of a protected beacon frame, in accordance with one or more example embodiments of the present disclosure.

Referring to FIG. 2A, the portion 200 of the protected beacon frame may include one or more fields, such as a header 204, a beacon body 206, and a frame check sequence (FCS) 208. The beacon body 206 may include a beacon management element (BME) 210, which may include a key ID field 212 having two octets, a management integrity check (MIC) field 214 having a variable length (e.g., 8 or 16 octets), an element identifier (element ID) field 216 having one octet, a length field 218 having one octet, and an integrity beacon number (IBN) field 220 having six octets.

The IEEE 802.11w technical standard defines a mechanism for protecting group-addressed management frames (e.g., management frames addressed to multiple devices/BSSs). In one or more embodiments, an AP (e.g., AP 102 of FIG. 1) may utilize cipher-based message authentication code (CMAC) and/or Galois message authentication code (GMAC) cipher suites with the key ID field 212 to determine the MIC field 214. The key ID field may be assigned to STAs by an AP following association, and may be updated by the AP using a GTK/IGK rekeying process.

The key ID field 212 may include information pertaining to an integrity group key (IGK) provided to STAs of a BSS to protect communications between the STAs and an AP. The information may include a value associated with a specific IGK. For instance, the key ID field 212 may include information about two sets of IGK values, each with its own key ID (e.g., key ID 1 and key ID 2). At any given time, only one of the IGK values (e.g., key ID 1) may be actively used by the AP to calculate the MIC field 214. The key ID field 212 may indicate the current active IGK value (e.g., key ID 1) used by the AP to determine the MIC field 214. The indicated active IGK value may be used by the STA to verify that a beacon frame is from the AP and not from a man-in-the-middle (MIM) attack or another device, for example. Specifically, the STA may use the key ID value indicated by the key ID field 212 and/or any other fields of the BME 210 to determine an expected MIC. The STA may then compare the expected MIC to the MIC field 214. If the expected MIC is the same as the MIC field 214 included in the beacon frame, the STA may validate the beacon frame as having been sent by the AP (e.g., a valid beacon frame).

In an embodiment, the IBN field 220 may increase (e.g., increment a count) with any beacon sent by an AP. For instance, a first beacon can have a first IBN field 220 value of X and a second beacon can have a second IBN field 220 of X+1, X+2, X+3, and so on. In certain instances, the value of the IBN field 220 may be utilized to determine whether the BSS is subject to a MIM attack. For example, if an STA receives a BME 210 with an IBN value the same or lower than the previously received IBN value, the STA may reject the beacon having determined that the IBN field 220 failed to increase between successive beacons. Rejection of the beacon for failure to have an increasing IBN field 220 may occur regardless of the MIC. That is, for instance, in embodiments utilizing successively increasing IBN values, determination of an incorrect IBN field 220 (i.e., the same or lower than the previously received IBN value) may result in the STA discarding the beacon frame without having to continue processing the remainder of the beacon frame. When an STA determines that the IBN field 220 has properly incremented from a previous beacon, the STA may continue to determine an expected MIC and compare the expected MIC to the MIC field 214.

In an embodiment, the IBN field 220 may be replaced or supplemented with an integrity group transient key packet number (IPN) field (not shown) defined and used for protected group-addressed management frames. Because the IPN field may be protected by the MIC, the IPN field may not be manipulated without causing MIC failure. The IPN value may be shared by the protected beacons and by other protected group-addressed management frames. The IPN value may increase with every successive protected beacon and protected group addressed management frame. If the STA identifies a BME 210 with an IPN value the same or lower than the previous received value, the STA may discard the beacon frame with the BME 210. Inclusion of the IPN field in a beacon frame may result in the addition of the management message integrity code information element (MMIE) (not shown) within a beacon frame.

Beacon frames may be sent in rapid succession (e.g., every 1024 µseconds). Some fields of a beacon frame may be relatively fixed or constant between respective beacon frames (e.g., an AP capabilities field or specific static working modes), while other fields may change more quickly (e.g., a time synchronization factor, a traffic indication map, and other fields). In an embodiment, some fields of a beacon frame may be protected by the MIC field 214 (e.g., some fields of the BME 210 may be used to determine the contents of the MIC field 214). For example, the fields of a beacon frame which remain relatively fixed or constant between beacons may be included in the MIC calculation, which other more variable fields may not be used to determine the contents of the MIC field 214.

The element ID field 216 may include a service set identifier (SSID), BSS membership selectors, parameter sets, a TIM, and other information. A TIM may include a DTIM count, a DTIM period, and bitmap details. The DTIM count may indicate how many beacon frames, including a beacon frame which includes the TIM, may appear before the next DTIM. The DTIM period may indicate the number of beacon intervals between successive DTIMs. Bits of the bitmap details may correspond to buffered traffic for a STA in a BSS. When a STA receives a beacon or probe response frame with the portion 200, the STA may determine when traffic is buffered at an AP for the STA, and when to expect another DTIM. The length field 218 field may indicate the length of the portion 200. The FCS field 208 may be used for error checking.

Figure 2B:
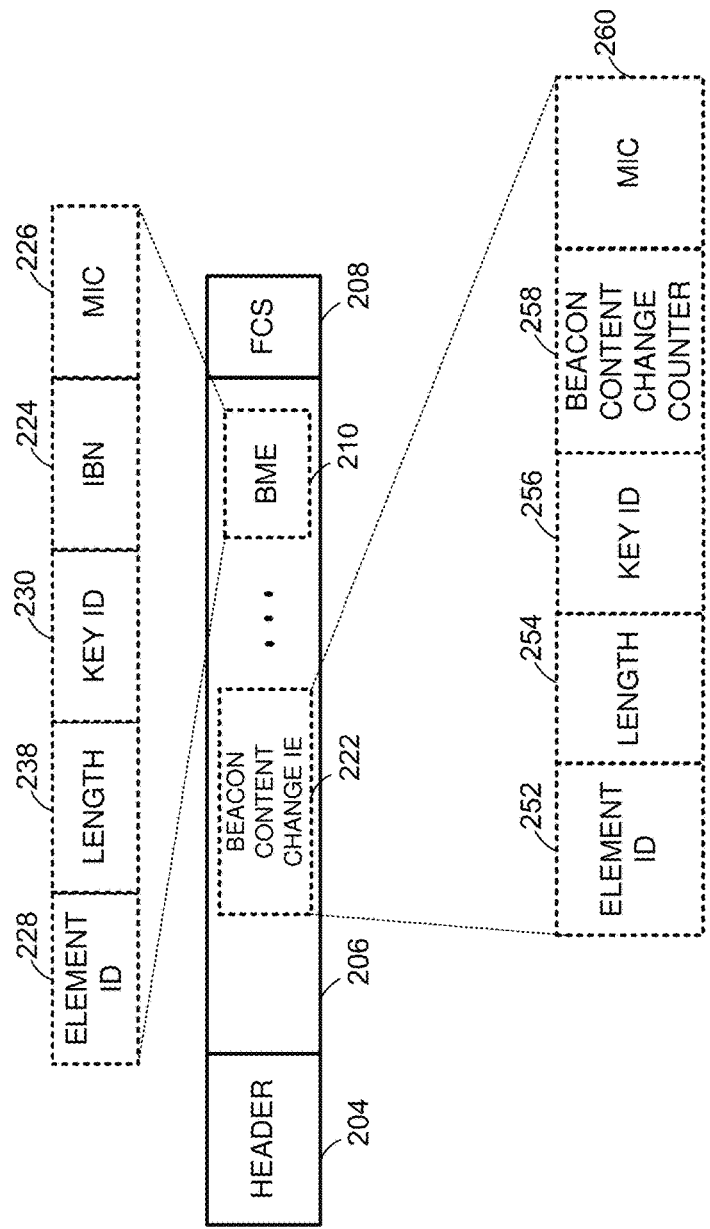
FIG. 2B depicts an illustrative portion of a protected beacon frame, in accordance with one or more example embodiments of the present disclosure.

FIG. 2B depicts an illustrative portion 250 of a protected beacon frame, in accordance with one or more example embodiments of the present disclosure.

The portion 250 may include the header 204, the body 206, the FCS field 208, and the BME 210 of the portion 200 of FIG. 2A. The body 206 also may include a beacon content change information element (IE) 222, which may indicate whether content of a beacon frame has changed respective to the content of a previously sent beacon. In an embodiment, the beacon content change IE field 222 may precede the BME 210 while maintaining the structure of the beacon frame (e.g., by including the beacon content change IE field 222 in the beacon body 206). The BME 210 may include an element ID field 228, a length field 238, a key ID field 230, an IBN field 224, and a MIC field 226. The IBN field 224 may indicate an element ID, a length of the IBN field 224, and multiple octets indicating an IBN which may increase for any beacon frame in a sequence of beacon frames.

In an embodiment, the beacon content change IE field 222 may include one or more fields, such an element ID field 252, a length field 254, a key ID field 256, a beacon content change counter field 258, and a MIC field 260. The beacon content change counter field 258 may indicate a counter increased per beacon change, and a counter reset following IGK rekeying. After IGK rekeying, an AP may reset the beacon content change counter field 258. The beacon content change IE field 222 may indicate whether the content of the beacon is changed or unchanged as compared to the content of a previously received beacon. When the content change counter field 258 increases, the beacon content may be different from the content of the previously received beacon. When the content change counter field 258 remains the same (e.g., was not incremented), the beacon content may be the same as the content from the previously received beacon and may be ignored. The beacon content change IE field 222 may include a beacon change key ID field 238, which may operate similarly to the key ID field 212 of FIG. 2A. An AP may generate an integrity beacon content transient key (IBCTK) described in the beacon change key ID field 238 and used to determine the beacon content change MIC 226 of the beacon content change IE 222. The IBCTK may be used with respect to the beacon content change MIC field 260 and may not affect the MIC 226 for the entire body 206 of a beacon frame. In an instance, the IBCTK may be set by the AP and provided to an STA as part of the association process.

In an embodiment, the beacon change MIC 260 may use CMAC and GMAC cipher suites and the beacon change key ID field 256 to protect the beacon content change IE 222 and the beacon content change counter field 258. In some embodiments, the beacon change MIC field 260 may be 8 or 16 bytes, or another length.

In one or more embodiments, to detect for unchanged beacons, the STA may analyze the beacon content change IE 222. When the beacon content change counter 258 decreases from a prior beacon, the STA may reject the beacon frame. If the beacon content change MIC 260 is wrong (e.g., does not match an expected MIC determined by the STA based on one or more fields of the beacon content change IE 222), the STA may reject the beacon frame. If the beacon content change counter 258 increases and the beacon content change MIC 260 is valid (e.g., matches an expected MIC), the STA may process remaining fields of a beacon frame.

In one or more embodiments, the beacon content change IE 222 may include an element ID 252 and an element length 254. The element ID 252 and element length 254 may be used in the beacon frame to determine the MIC 260.

Use of a beacon content change IE 222 can reduce CPU load, particularly for software implementations, by decreasing the number of beacon frames parsed by the CPU per given time. For example, unchanged beacon frames may be ignored without requiring complete parsing therethrough. For hardware implementations, a receiving STA may determine a MIC over an entire beacon frame body for any received beacon using a CMAC and GMAC algorithm. The use of a beacon content change IE 222 may not be required for hardware implementations of protected beacon frames in accordance with one or more embodiments described herein.

In one or more embodiments, a beacon frame may include a timestamp field (not shown). Timestamp field may be omitted from the MIC calculation (e.g., because any beacon frame may have a different timestamp, resulting in significant processing requirements for any received beacon to account for a new timestamp). However, excluding the timestamp from the MIC may result in the timestamp field being unprotected, permitting a MIM attack to create a forged timestamp potentially resulting in the STA being unable to receive group addressed frames. The timestamp may be included partially in the MIC calculation. For example, the first X number of bits (e.g., over 16 μseconds) of the timestamp field may be set to 0 (e.g., masked out). Because beacon frames may be transmitted at fixed intervals, such as every 100 time units (e.g., where each time unit is 1024 μseconds), even if one beacon transmission becomes delayed, the following beacon's planned transmission time may remain on the fixed 100 time unit interval of the originally planned transmission time (e.g., not the actual transmission time). Thus, the MIC may be determined in advance (i.e., prior to insertion of the timestamp field into the beacon frame) and compared to the actual timestamp received. For beacons transmitted at the correct planned time, the timestamp's lowest X bits (μseconds) may be 0. Unless a beacon is delayed by more than Y μseconds, the timestamp may not change. In such a manner, the partial timestamp may be included in the MIC calculations.

Figure 2C:
FIG. 2C depicts an illustrative portion of a protected beacon frame, in accordance with one or more example embodiments of the present disclosure.

FIG. 2C depicts an illustrative portion 270 of a protected beacon frame, in accordance with one or more example embodiments of the present disclosure.

Referring to FIG. 2C, a previous beacon timestamp field 242 of a previously received beacon frame may be included in the MIC calculation. The portion 270 may include an element ID field 232, a length field 234, an element ID extension field 236, and the previous beacon timestamp field 242. The previous beacon timestamp field 242 may be inserted into a beacon frame and included in the MIC calculation of the next beacon received. The current timestamp may remain excluded from the current MIC calculation. In such a manner, the STA may determine whether the timestamp field is forged in a later occurring beacon frame. The STA may reject beacon frames that are determined to be forged through the previous beacon timestamp field 242.

Referring to FIGS. 2A-2C, an AP may support multiple virtual APs/BSSIDs (i.e., VAPs). An AP (e.g., AP 102 of FIG. 1) may transmit a single beacon shared across the VAPs with a new key (MultiBssIGK) shared by the VAPs of the multiple BSSID. The shared MultiBssIGK may be shared by multiple BSSs associated with a common physical AP, and the MultiBssIGK may be in addition to any keys specific to a BSS of the AP. The multiple BSSID beacon may be received and processed by all of the STAs associated with any of the VAPs in the multiple BSSID set. In such a manner, one VAP (e.g., a transmitted BSSID) may transmit a single beacon frame intended to communicate information to multiple BSSs by using a common key for protecting the beacon frame. For example, referring to FIG. 2A, the MultiBssIGK may use the BME 210 including the key ID field 212. The MultiBssIGK may be determined from among a plurality of possible MultiBssIGKs by correlating the key ID field 212 to the correct MultiBssIGK. The MultiBssIGK may be assigned by an AP to an STA using a 4-way handshake mechanism, for example. A transmission from AP to STA may include a specific AP IGK and GTK key ID, and may indicate multiple BSSID sets, a MultiBssIGK, and a MultiBssIGK key ID. The MultiBssIGTK may be updated using the IGK rekeying mechanism. A Group Key Updated message may be transmitted from the AP to an STA and may include a specific AP IGK and the IGK key ID, as well as multiple BSSID sets MultiBssIGK and the MultiBssIGK key ID.

In one or more embodiments, a MultiBss Beacon number (MBN) can act as a counter shared by the VAPs of a multiple BSSID set. The MBN may be increased per transmitted MultiBss beacon frame. The MBN may replace or supplement the IBN field 220 of FIG. 2A. When the MBN does not increase between successive beacon frames, the STA(s) associated with the multiple BSSID set may ignore the latest beacon frame. Such a beacon frame may have been sent by an imposter AP, subjecting the BSSID set to a MIM attack, for example.

In one or more embodiments, group-addressed management frames may be configured to include a protected beacon. The transmitting AP may use CMAC and GMAC cipher suites and the IGK to calculate the MIC over the group-addressed management frame. The AP may add the MIC to a group-addressed management frame body. The AP may use a management MIC IE (MMIE) for beacon frame protection. A receiving STA may calculate the expected MIC on the received group-addressed management frame and may compare the result to the MIC field within the MMIE. The STA may not calculate the expected MIC using the MIC field within the MMIE. When the expected MIC matches the MIC field within the MMIE, the frame is valid. When the expected MIC differs from the MIC field within the MMIE, the STA may ignore the beacon as having been manipulated by a MIM attack, for example.

Figure 3:
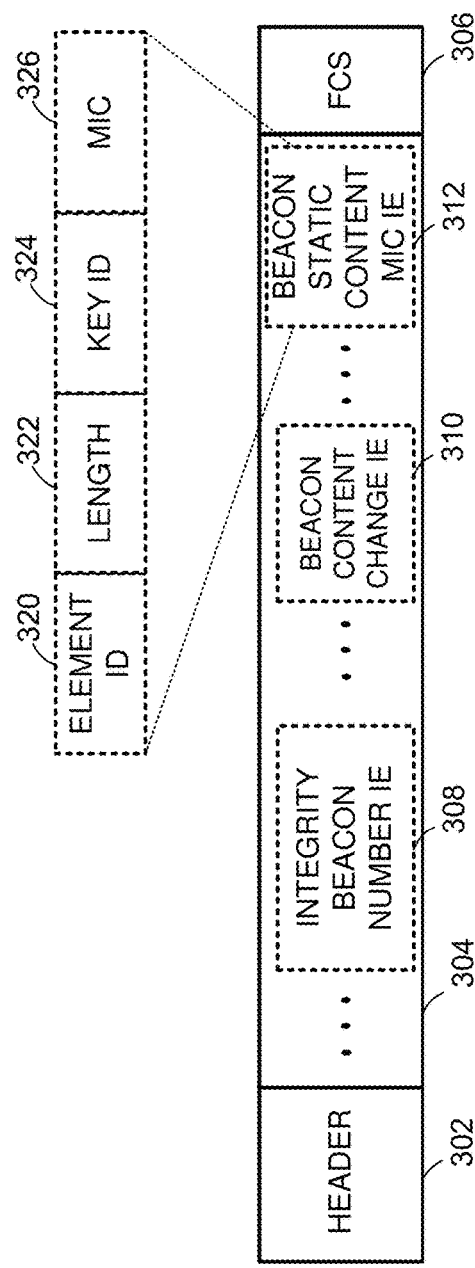
FIG. 3 depicts an illustrative portion of a protected beacon frame, in accordance with one or more example embodiments of the present disclosure.

FIG. 3 depicts an illustrative portion 300 of a protected beacon frame, in accordance with one or more example embodiments of the present disclosure.

Referring to FIG. 3, the portion 300 may include a header 302, a body 304, and an FCS 306. The body 304 may include a beacon integrity number IE 308, a beacon content change IE 310, and a beacon static content MIC IE 312. The beacon static content MIC IE 312 may include an element ID field 320, a length field 322, a key ID field 324, and a MIC field 326. The beacon integrity number IE 308 may indicate a beacon count, and the beacon content change IE 310 may indicate whether a beacon includes any content different from a previous beacon sent by the same AP. When the beacon content change IE 310 is protected by the MIC field 326 (e.g., is included in the determination of the MIC field 326), an STA may determine if a beacon is valid by determining if a beacon count increased and/or if an expected MIC matches the MIC field 326 based on the beacon content change IE 310.

In one or more embodiments, an AP (e.g., AP 102 of FIG. 1) may use CMAC and/or GMAC cipher suites and an IGTK key (e.g., as indicated by the key ID field 324) to determine a value for the MIC field 326 over static fields (e.g., the fields which did not change from a previous beacon frame). A receiving STA may determine an expected MIC based on the static fields, and may compare the expected result to the MIC field 326 in the beacon static content MIC IE 312. When the expected MIC matches the MIC field 326, the beacon may be valid. When the expected MIC does not match the MIC field 326, the STA may ignore the beacon frame.

Referring to FIGS. 2A-2C and FIG. 3, an AP may indicate whether a protected beacon mechanism is supported. When an AP indicates that a protected beacon mechanism is supported, but the STA receiving a beacon fails to identify a corresponding element or field used to protect the beacon according to an indicated mode, the STA may discard the beacon. To indicate a protected beacon mode, an AP may include a robust secure network (RSN) element (not shown) in a management frame (e.g., an association response frame). The RSN element may include one or more fields of a management frame. For example, bits 14 and 15 of an RSN capabilities field (not shown) of an association response sent by an AP may be used to indicate a protected beacon mechanism, and which one. For example, bit 14 (e.g., a full beacon protection enable field) may indicate that full beacon protection is supported and activated by an AP. Bit 15 (e.g., a static beacon protection enable field) may indicate that beacon protection is enabled using static IEs. When bit 14 is 1 and bit 15 is 0 in an association response, an integrity beacon number IE may be included, a beacon content change IE may be optional, a beacon static content MIC IE may not be included, and a beacon MIC IE may be included. When bit 14 is 0 and bit 15 is 1, an integrity beacon number IE may be included, a beacon content change IE may be included, a beacon static content MIC IE may be included, and a beacon MIC IE may not be included. If bits 14 and 15 are a 1, an integrity beacon number IE may be included, a beacon content change IE may be included, a beacon static content MIC IE may be included, and a beacon MIC IE may be included.

Figure 4:
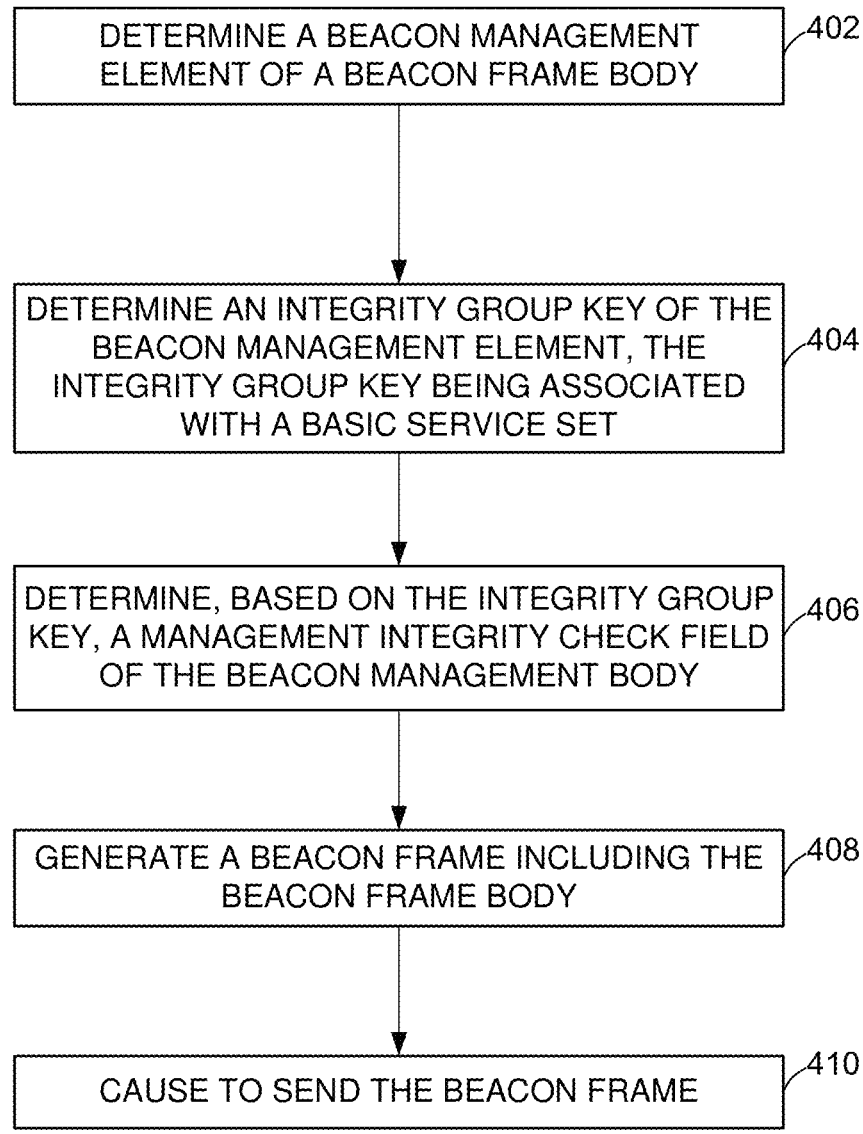
FIG. 4 illustrates a flow diagram of an illustrative process for using a protected beacon frame, in accordance with one or more example embodiments of the present disclosure.

FIG. 4 illustrates a flow diagram of illustrative process 400 for using a protected beacon frame, in accordance with one or more example embodiments of the present disclosure.

At block 402, processing circuitry of a device (e.g., the user device(s) 120 and/or the AP 102 of FIG. 1) may determine a beacon management element (BME) of a beacon frame body (e.g., the BME 210 of the body 206 of FIG. 2A). The AP may set the BME of a beacon frame. The BME may include one or more fields, any of which may be used to determine a MIC field (e.g., the MIC field 214 of FIG. 2A). The fields of the BME may include an integrity group key identifier, an element identifier field, a length field, and an integrity beacon number field used to identify the number of a beacon frame in a sequence of beacon frames. The device may increment the integrity beacon number field in a subsequent beacon, and a receiving STA may determine whether a beacon frame is valid based on whether the integrity beacon number field of a beacon has a value greater than the value of a prior beacon frame. Depending on which fields of the BME or any other portions of the beacon frame are used to determine the value of the MIC field, a receiving STA may determine an expected MIC value and compare the expected MIC value to the value of the MIC field in a received beacon frame to determine whether the expected MIC and the actual MIC match.

At block 404, the processing circuitry may determine an integrity group key (IGK) identifier of the BME of a beacon body of a beacon frame (e.g., the key ID field 212 of FIG. 2A). The IGK may be associated with a basic service set (BSS). The IGK may be one of multiple IGKs available for a BSS, and the IGK identifier may indicate which IGK is active. In a multi-BSSID set, the device may use one IGK for multiple VAPs associated with the device, thereby avoiding the need to send multiple beacon frames to multiple BSSs. The device may include one or more indications in a beacon frame indicating whether any fields of the beacon frame have changed from a prior beacon frame, and may include one or more indications of which fields in a beacon frame an STA may use to determine an expected MIC value.

At block 406, the processing circuitry may determine, based on the IGK, a MIC field of the beacon management element (e.g., the MIC field 214). The MIC field may be determined based on the IGK and/or any other fields in the BME or in the beacon frame. For example, the MIC field may be based on a beacon number included in the BME or elsewhere in a beacon frame. The MIC field may be used to protect a beacon frame and may be based on one or more IEs such as an integrity beacon number element, a beacon content change element, and a beacon static content MIC element. Depending on which information in a beacon frame the device uses to determine the MIC field, the device may reduce the likelihood of a successful MIM attack on a receiving device. For example, if the MIC field has a value that is determined based on a combination of multiple fields of a beacon frame, then another device posing as the device (e.g., for a MIM attack) may not manipulate the values of such fields without the resulting MIC field failing to match the expected MIC field as determined by a receiving STA.

At block 408, processing circuitry (e.g., of an AP) may generate a beacon frame including the beacon body with the MIC field. Generating the beacon frame may include generating a header, a beacon body with the BME or other IEs used to determine the MIC field or another MIC field, and generating a FCS field. The beacon frame may include information for a single BSS or for multiple BSSs, and may include information regarding device/network capabilities which may be received and processed by devices not associated with a network provided by the device.

At block 410, the processing circuitry (e.g., of an AP) may cause to send the beacon frame. An STA may determine an expected MIC based on the information in the BME (e.g., the IGK), and may compare the expected MIC to the actual value included in the MIC field to determine whether the beacon is valid or not. If the expected MIC and actual MIC field value of a beacon frame do not match, and STA may discard the beacon frame and send a notification to the device that an attack may have been attempted. The beacon may include information for one or multiple BSSs.

It is understood that the above descriptions are for purposes of illustration and are not meant to be limiting.

FIG. 5 shows a functional diagram of an exemplary communication station 500 in accordance with some embodiments. In one embodiment, FIG. 5 illustrates a functional block diagram of a communication station that may be suitable for use as an AP 102 (FIG. 1) or user device 120 (FIG. 1) in accordance with some embodiments. The communication station 500 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 500 may include communications circuitry 502 and a transceiver 510 for transmitting and receiving signals to and from other communication stations using one or more antennas 501. The communications circuitry 502 may include circuitry that can operate the physical layer (PHY) communications and/or media access control (MAC) communications for controlling access to the wireless medium, and/or any other communications layers for transmitting and receiving signals. The communication station 500 may also include processing circuitry 506 and memory 508 arranged to perform the operations described herein. In some embodiments, the communications circuitry 502 and the processing circuitry 506 may be configured to perform operations detailed in FIGS. 1, 2A-2C, 3, and 4.

In accordance with some embodiments, the communications circuitry 502 may be arranged to contend for a wireless medium and configure frames or packets for communicating over the wireless medium. The communications circuitry 502 may be arranged to transmit and receive signals. The communications circuitry 502 may also include circuitry for modulation/demodulation, upconversion/downconversion, filtering, amplification, etc. In some embodiments, the processing circuitry 506 of the communication station 500 may include one or more processors. In other embodiments, two or more antennas 501 may be coupled to the communications circuitry 502 arranged for sending and receiving signals. The memory 508 may store information for configuring the processing circuitry 506 to perform operations for configuring and transmitting message frames and performing the various operations described herein. The memory 508 may include any type of memory, including non-transitory memory, for storing information in a form readable by a machine (e.g., a computer). For example, the memory 508 may include a computer-readable storage device, read-only memory (ROM), random-access memory (RAM), magnetic disk storage media, optical storage media, flash-memory devices and other storage devices and media.

In some embodiments, the communication station 500 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 500 may include one or more antennas 501. The antennas 501 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 500 may include one or more of a keyboard, a display, a non-volatile memory port, multiple antennas, a graphics processor, an application processor, speakers, and other mobile device elements. The display may be an LCD screen including a touch screen.

Although the communication station 500 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 500 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 500 may include one or more processors and may be configured with instructions stored on a computer-readable storage device memory.

FIG. 6 illustrates a block diagram of an example of a machine 600 or system upon which any one or more of the techniques (e.g., methodologies) discussed herein may be performed. In other embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environments. The machine 600 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a power management device 632, a graphics display device 610, an alphanumeric input device 612 (e.g., a keyboard), and a user interface (UI) navigation device 614 (e.g., a mouse). In an example, the graphics display device 610, alphanumeric input device 612, and UI navigation device 614 may be a touch screen display. The machine 600 may additionally include a storage device (i.e., drive unit) 616, a signal generation device 618 (e.g., a speaker), a beacon protection device 619, a network interface device/transceiver 620 coupled to antenna(s) 630, and one or more sensors 628, such as a global positioning system (GPS) sensor, a compass, an accelerometer, or other sensor. The machine 600 may include an output controller 634, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)). The operations in accordance with one or more example embodiments of the present disclosure may be carried out by a baseband processor. The baseband processor may be configured to generate corresponding baseband signals. The baseband processor may further include physical layer (PHY) and medium access control layer (MAC) circuitry, and may further interface with the hardware processor 602 for generation and processing of the baseband signals and for controlling operations of the main memory 604, the storage device 616, and/or the beacon protection device 619. The baseband processor may be provided on a single radio card, a single chip, or an integrated circuit (IC).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within the static memory 606, or within the hardware processor 602 during execution thereof by the machine 600. In an example, one or any combination of the hardware processor 602, the main memory 604, the static memory 606, or the storage device 616 may constitute machine-readable media.

The beacon protection device 619 may carry out or perform any of the operations and processes (e.g., process 400) described and shown above.

It is understood that the above are only a subset of what the beacon protection device 619 may be configured to perform and that other functions included throughout this disclosure may also be performed by the beacon protection device 619.

In an embodiment, the beacon protection device 619 may be configured to perform operations to validate a received beacon frame. The operations can include identifying, at a STA of a (BSS, a beacon frame received from an AP; determining a BME for the beacon frame, the BME including an integrity group key (IGK) associated with the BSS; determining, based on the IGK, an expected MIC; determining a MIC field of the BME; determining whether the expected MIC field matches the MIC field of the BME; and determining one or more additional fields of the beacon frame subsequent to the BME.

The beacon protection device 619 may be configured to further reject, at the station device, the beacon frame when the expected MIC does not match the MIC field of the BME. Alternatively, the computer-readable medium can be configured to further validate the beacon frame when the expected MIC matches the MIC field of the BME.

In an embodiment, the beacon protection device 619 may be configured to determine a first IBN from a first beacon frame and a second IBN from a second beacon frame. The beacon protection device 619 may be configured to determine whether the second IBN is greater than the first IBN. The beacon protection device 619 may reject the second beacon when the second IBN is determined to be less than the first IBN. The beacon protection device 619 may validate the second beacon frame when the second IBN is determined to be greater than the first IBN. Validating the IBN can be performed prior to calculating the expected MIC. In such a manner, the beacon protection device 619 may proceed to calculate the expected MIC after the IBN is validated.

In certain instances, the beacon protection device 619 may be further configured to notify the AP when there is an issue with the beacon, such as an incorrect IBN or MIC, so as to alert the AP of a man-in-the-middle (MIM) attack. The AP may be able to take responsive action to address the MIM imposter.

When implemented on an AP, the beacon protection device 619 may indicate a protected beacon capability, generate a beacon frame with a MIC, and send the beacon frame. The MIC may be included in a BME within a beacon frame body using an existing beacon frame structure.

While the machine-readable medium 622 is illustrated as a single medium, the term "machine-readable medium" may include a single medium or multiple media (e.g., a centralized or distributed database, and/or associated caches and servers) configured to store the one or more instructions 624.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 600 and that cause the machine 600 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device/transceiver 620 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 620 may include one or more physical jacks (e.g., Ethernet, coaxial, or phone jacks) or one or more antennas to connect to the communications network 626. In an example, the network interface device/transceiver 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 600 and includes digital or analog communications signals or other intangible media to facilitate communication of such software. The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, an evolved node B (eNodeB), or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

Example 1 may be a device comprising memory and processing circuitry configured to: determine a beacon management element (BME) of a beacon frame body; determine an integrity group key identifier of the BME, wherein the integrity group key identifier is associated with a basic service set (BSS); determine, based on the integrity group key identifier, a management integrity check (MIC) field of the BME; generate a beacon frame, wherein the beacon frame comprises the beacon frame body; and cause to send the beacon frame.

Example 2 may include the device of example 1 and/or some other example herein, wherein the processing circuitry is further configured to determine one or more additional fields of the BME, and wherein to determine the MIC field is further based on the one or more additional fields.

Example 3 may include the device of example 2 and/or some other example herein, wherein the one or more additional fields comprise an element identifier field, a length field, and an integrity beacon number field.

Example 4 may include the device of example 1 and/or some other example herein, wherein the beacon frame is a first beacon frame, wherein the MIC field is a first MIC field, wherein the processing circuitry is further configured to determine a second beacon frame, and wherein the second beacon frame comprises a second MIC field different than the first MIC field.

Example 5 may include the device of example 4 and/or some other example herein, wherein the first beacon frame comprises a first beacon number field, wherein the first MIC field is further based on the first beacon number field, wherein the second beacon frame further comprises a second beacon number field and a second MIC field based on the second beacon number field, wherein the second beacon number is greater than the first beacon number, and wherein the first MIC field is different than the second MIC field.

Example 6 may include the device of example 1 and/or some other example herein, wherein the BSS is one of multiple BSSs in a multiple basic service set identification (BSSID) set, and wherein the integrity group key identifier is associated with the multiple BSSs.

Example 7 may include the device of example 1 and/or some other example herein, wherein to determine the BME comprises to determine the BME without determining a time synchronization factor (TSF).

Example 8 may include the device of example 1 and/or some other example herein, further comprising: a transceiver configured to transmit and receive wireless signals, wherein the wireless signals comprise the beacon frame; and an antenna coupled to the transceiver.

Example 9 may include a non-transitory computer-readable medium storing computer-executable instructions which when executed by one or more processors result in performing operations comprising: identifying, at a station device of a basic service set (BSS), a beacon frame received from an access point; determining a beacon management entity (BME) of the beacon frame, wherein a beacon body of the beacon frame comprises the BME, and wherein the BME comprises an integrity group key identifier associated with the BSS; determining, based on the integrity group key identifier, an expected management integrity check (MIC); determining a MIC field of the BME; and comparing the expected MIC to the MIC field of the BME.

Example 10 may include the non-transitory computer-readable medium of example 9 and/or some other example herein, the operations further comprising: determining, based on the comparison, that the expected MIC does not match the MIC field; and discarding the beacon frame.

Example 11 may include the non-transitory computer-readable medium of example 9 and/or some other example herein, wherein the beacon frame is a first beacon frame, the operations further comprising: determining a first integrity beacon number (IBN) of the first beacon frame; identifying a second beacon frame received from the access point; determining a second IBN of the second beacon frame; determining that the second IBN is less than or equal to the first IBN; and discarding the second beacon frame.

Example 12 may include the non-transitory computer-readable medium of example 9 and/or some other example herein, wherein determining the MIC is based on the integrity group key identifier.

Example 13 may include the non-transitory computer-readable medium of example 9 and/or some other example herein, wherein the beacon frame is a first beacon frame, and wherein determining the expected MIC is based on a beacon timestamp of a second beacon frame, the operations further comprising identifying the second beacon frame before identifying the first beacon frame.

Example 14 may include the non-transitory computer-readable medium of example 9 and/or some other example herein, wherein determining the MIC field is based on one or more additional fields of the BME, and wherein the one or more additional fields comprise at least one of an element identifier field, a length field, or an integrity beacon number field.

Example 15 may include the non-transitory computer-readable medium of example 9 and/or some other example herein, wherein the BSS is one of multiple BSSs in a multiple basic service set identification (BSSID) set, and wherein the integrity group key identifier is associated with the multiple BSSs.

Example 16 may include the non-transitory computer-readable medium of example 9 and/or some other example herein, wherein the MIC is not based on a time synchronization factor (TSF).

Example 17 may include a method comprising: determining, by processing circuitry of an access point, a beacon management element (BME) of a beacon frame body; determining, by the processing circuitry, an integrity group key identifier of the BME, wherein the integrity group key identifier is associated with a basic service set (BSS); determining, by the processing circuitry and based on the integrity group key identifier, a management integrity check (MIC) field of the BME; generating, by the processing circuitry, a beacon frame, wherein the beacon frame comprises the beacon frame body; and causing to send, by the processing circuitry, the beacon frame.

Example 18 may include the method of example 17 and/or some other example herein, further comprising determining one or more additional fields of the BME, and wherein determining the MIC field is further based on the one or more additional fields.

Example 19 may include the method of example 18 and/or some other example herein, wherein the one or more additional fields comprise an element identifier field, a length field, and an integrity beacon number field.

Example, 20 may include the method of example 17 and/or some other example herein, wherein the beacon frame is a first beacon frame, wherein the MIC field is a first MIC field, further comprising determining a second beacon frame, and wherein the second beacon frame comprises a second MIC field different than the first MIC field.

Example 21 may include an apparatus comprising means for: determining a beacon management element (BME) of a beacon frame body; determining an integrity group key identifier of the BME, wherein the integrity group key identifier is associated with a basic service set (BSS); determining, based on the integrity group key identifier, a management integrity check (MIC) field of the BME; generating a beacon frame, wherein the beacon frame comprises the beacon frame body; and causing to send the beacon frame.

Example 22 may include one or more non-transitory computer-readable media comprising instructions to cause an electronic device, upon execution of the instructions by one or more processors of the electronic device, to perform one or more elements of a method described in or related to any of examples 1-21, or any other method or process described herein.

Example 23 may include an apparatus comprising logic, modules, and/or circuitry to perform one or more elements of a method described in or related to any of examples 1-21, or any other method or process described herein.

Example 24 may include a method, technique, or process as described in or related to any of examples 1-21 or portions or parts thereof.

Example 25 may include an apparatus comprising: one or more processors and one or more computer readable media comprising instructions that, when executed by the one or more processors, cause the one or more processors to perform the method, techniques, or process as described in or related to any of examples 1-21, or portions thereof.

Example 26 may include a method of communicating in a wireless network as shown and described herein.

Example 27 may include a system for providing wireless communication as shown and described herein.

Example 28 may include a device for providing wireless communication as shown and described herein.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

Figure 7:
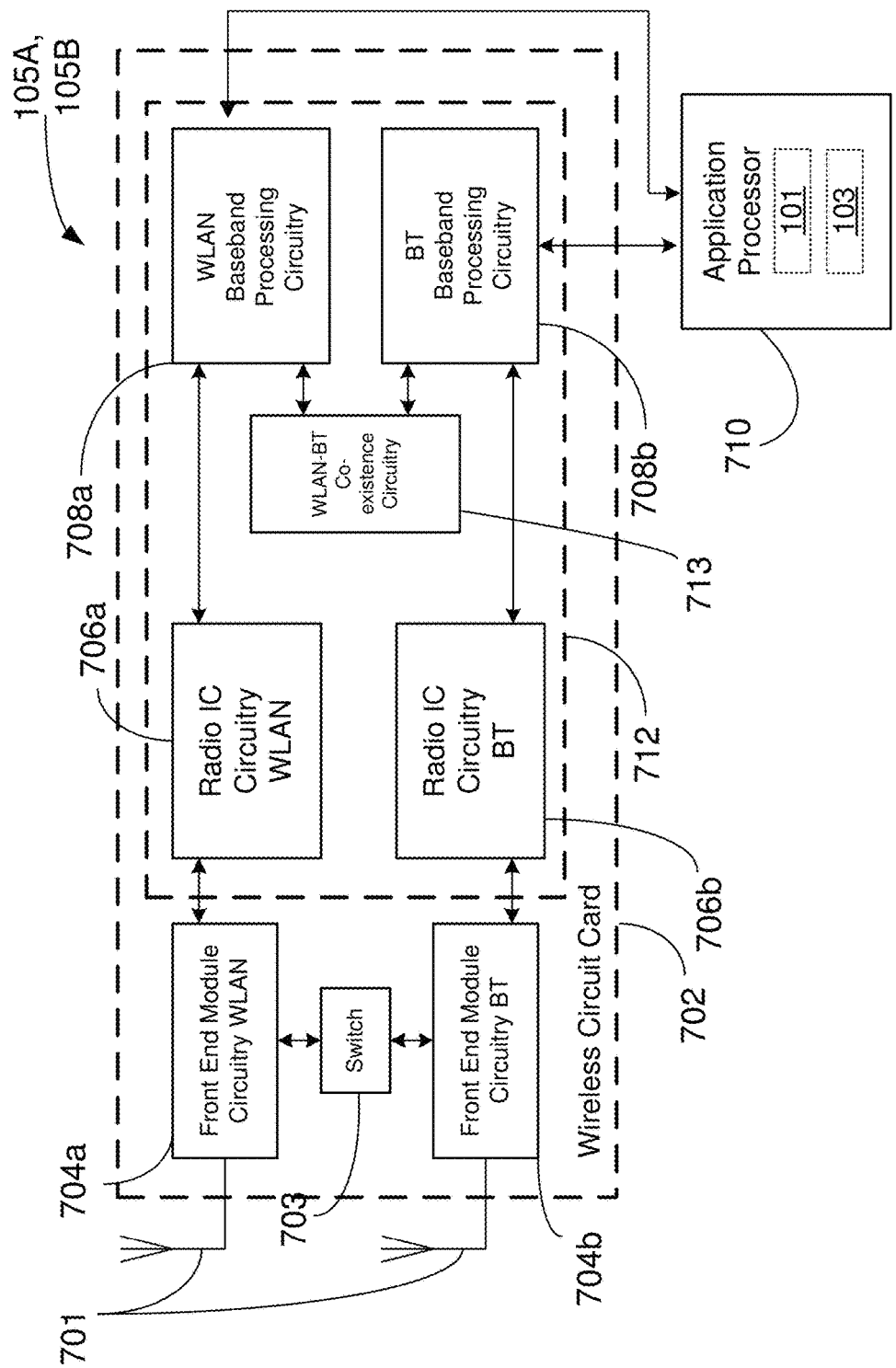
FIG. 7 is a block diagram of a radio architecture in accordance with some examples.

FIG. 7 is a block diagram of a radio architecture 105A, 105B in accordance with some embodiments that may be implemented in any one of the example AP 102 and/or the example user device(s) 120 of FIG. 1. Radio architecture 105A, 105B may include radio front-end module (FEM) circuitry 704a-b, radio IC circuitry 706a-b and baseband processing circuitry 708a-b. Radio architecture 105A, 105B as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 704a-b may include a WLAN or Wi-Fi FEM circuitry 704a and a Bluetooth (BT) FEM circuitry 704b. The WLAN FEM circuitry 704a may include a receive signal path comprising circuitry configured to operate on WLAN RF signals received from one or more antennas 701, to amplify the received signals and to provide the amplified versions of the received signals to the WLAN radio IC circuitry 706a for further processing. The BT FEM circuitry 704b may include a receive signal path which may include circuitry configured to operate on BT RF signals received from one or more antennas 701, to amplify the received signals and to provide the amplified versions of the received signals to the BT radio IC circuitry 706b for further processing. FEM circuitry 704a may also include a transmit signal path which may include circuitry configured to amplify WLAN signals provided by the radio IC circuitry 706a for wireless transmission by one or more of the antennas 701. In addition, FEM circuitry 704b may also include a transmit signal path which may include circuitry configured to amplify BT signals provided by the radio IC circuitry 706b for wireless transmission by the one or more antennas. In the embodiment of FIG. 7, although FEM 704a and FEM 704b are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 706a-b as shown may include WLAN radio IC circuitry 706a and BT radio IC circuitry 706b. The WLAN radio IC circuitry 706a may include a receive signal path which may include circuitry to down-convert WLAN RF signals received from the FEM circuitry 704a and provide baseband signals to WLAN baseband processing circuitry 708a. BT radio IC circuitry 706b may in turn include a receive signal path which may include circuitry to down-convert BT RF signals received from the FEM circuitry 704b and provide baseband signals to BT baseband processing circuitry 708b. WLAN radio IC circuitry 706a may also include a transmit signal path which may include circuitry to up-convert WLAN baseband signals provided by the WLAN baseband processing circuitry 708a and provide WLAN RF output signals to the FEM circuitry 704a for subsequent wireless transmission by the one or more antennas 701. BT radio IC circuitry 706b may also include a transmit signal path which may include circuitry to up-convert BT baseband signals provided by the BT baseband processing circuitry 708b and provide BT RF output signals to the FEM circuitry 704b for subsequent wireless transmission by the one or more antennas 701. In the embodiment of FIG. 7, although radio IC circuitries 706a and 706b are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 708a-b may include a WLAN baseband processing circuitry 708a and a BT baseband processing circuitry 708b. The WLAN baseband processing circuitry 708a may include a memory, such as, for example, a set of RAM arrays in a Fast Fourier Transform or Inverse Fast Fourier Transform block (not shown) of the WLAN baseband processing circuitry 708a. Each of the WLAN baseband circuitry 708a and the BT baseband circuitry 708b may further include one or more processors and control logic to process the signals received from the corresponding WLAN or BT receive signal path of the radio IC circuitry 706a-b, and to also generate corresponding WLAN or BT baseband signals for the transmit signal path of the radio IC circuitry 706a-b. Each of the baseband processing circuitries 708a and 708b may further include physical layer (PHY) and medium access control layer (MAC) circuitry, and may further interface with a device for generation and processing of the baseband signals and for controlling operations of the radio IC circuitry 706a-b.

Referring still to FIG. 7, according to the shown embodiment, WLAN-BT coexistence circuitry 713 may include logic providing an interface between the WLAN baseband circuitry 708a and the BT baseband circuitry 708b to enable use cases requiring WLAN and BT coexistence. In addition, a switch 703 may be provided between the WLAN FEM circuitry 704a and the BT FEM circuitry 704b to allow switching between the WLAN and BT radios according to application needs. In addition, although the antennas 701 are depicted as being respectively connected to the WLAN FEM circuitry 704a and the BT FEM circuitry 704b, embodiments include within their scope the sharing of one or more antennas as between the WLAN and BT FEMs, or the provision of more than one antenna connected to each of FEM 704a or 704b.

In some embodiments, the front-end module circuitry 704a-b, the radio IC circuitry 706a-b, and baseband processing circuitry 708a-b may be provided on a single radio card, such as wireless radio card 702. In some other embodiments, the one or more antennas 701, the FEM circuitry 704*a-b* and the radio IC circuitry 706*a-b* may be provided on a single radio card. In some other embodiments, the radio IC circuitry 706*a-b* and the baseband processing circuitry 708*a-b* may be provided on a single chip or integrated circuit (IC), such as IC 712.

In some embodiments, the wireless radio card 702 may include a WLAN radio card and may be configured for Wi-Fi communications, although the scope of the embodiments is not limited in this respect. In some of these embodiments, the radio architecture 105A, 105B may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 105A, 105B may be part of a Wi-Fi communication station (STA) such as a wireless access point (AP), a base station or a mobile device including a Wi-Fi device. In some of these embodiments, radio architecture 105A, 105B may be configured to transmit and receive signals in accordance with specific communication standards and/or protocols, such as any of the Institute of Electrical and Electronics Engineers (IEEE) standards including, 802.11n-2009, IEEE 802.11-2012, IEEE 802.11-2016, 802.11n-2009, 802.11ac, 802.11ah, 802.11ad, 802.11 ay and/or 802.11ax standards and/or proposed specifications for WLANs, although the scope of embodiments is not limited in this respect. Radio architecture 105A, 105B may also be suitable to transmit and/or receive communications in accordance with other techniques and standards.

In some embodiments, the radio architecture 105A, 105B may be configured for high-efficiency Wi-Fi (HEW) communications in accordance with the IEEE 802.11ax standard. In these embodiments, the radio architecture 105A, 105B may be configured to communicate in accordance with an OFDMA technique, although the scope of the embodiments is not limited in this respect.

In some other embodiments, the radio architecture 105A, 105B may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, the BT baseband circuitry 708*b* may be compliant with a Bluetooth (BT) connectivity standard such as Bluetooth, Bluetooth 8.0 or Bluetooth 6.0, or any other iteration of the Bluetooth Standard.

In some embodiments, the radio architecture 105A, 105B may include other radio cards, such as a cellular radio card configured for cellular (e.g., 5GPP such as LTE, LTE-Advanced or 7G communications).

In some IEEE 802.11 embodiments, the radio architecture 105A, 105B may be configured for communication over various channel bandwidths including bandwidths having center frequencies of about 900 MHz, 2.4 GHz, 5 GHz, and bandwidths of about 2 MHz, 4 MHz, 5 MHz, 5.5 MHz, 6 MHz, 8 MHz, 10 MHz, 20 MHz, 40 MHz, 80 MHz (with contiguous bandwidths) or 80+80 MHz (160 MHz) (with non-contiguous bandwidths). In some embodiments, a 920 MHz channel bandwidth may be used. The scope of the embodiments is not limited with respect to the above center frequencies however.

Figure 8:
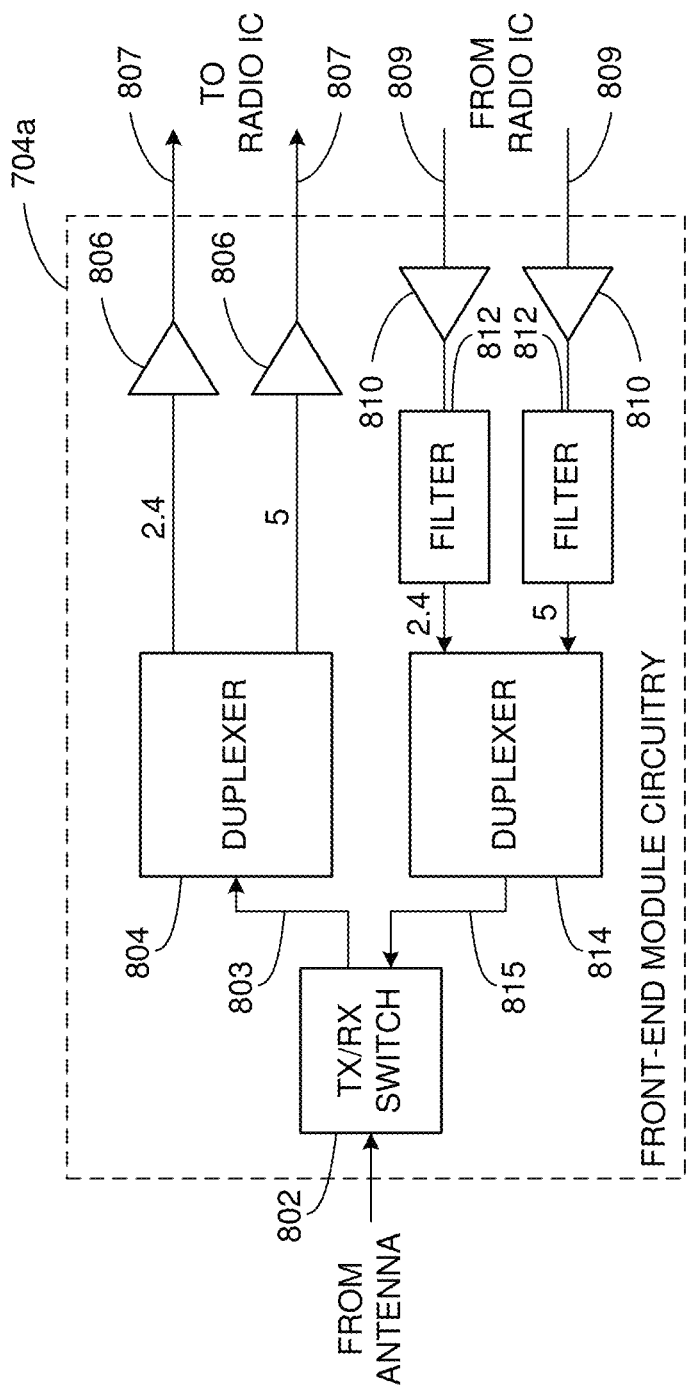
FIG. 8 illustrates an example front-end module circuitry for use in the radio architecture of FIG. 7, in accordance with one or more example embodiments of the present disclosure.

FIG. 8 illustrates WLAN FEM circuitry 704*a* in accordance with some embodiments. Although the example of FIG. 8 is described in conjunction with the WLAN FEM circuitry 704*a*, the example of FIG. 8 may be described in conjunction with the example BT FEM circuitry 704*b* (FIG. 7), although other circuitry configurations may also be suitable.

In some embodiments, the FEM circuitry 704*a* may include a TX/RX switch 802 to switch between transmit mode and receive mode operation. The FEM circuitry 704*a* may include a receive signal path and a transmit signal path. The receive signal path of the FEM circuitry 704*a* may include a low-noise amplifier (LNA) 806 to amplify received RF signals 803 and provide the amplified received RF signals 807 as an output (e.g., to the radio IC circuitry 706*a-b* (FIG. 7)). The transmit signal path of the circuitry 704*a* may include a power amplifier (PA) to amplify input RF signals 809 (e.g., provided by the radio IC circuitry 706*a-b*), and one or more filters 812, such as band-pass filters (BPFs), low-pass filters (LPFs) or other types of filters, to generate RF signals 815 for subsequent transmission (e.g., by one or more of the antennas 701 (FIG. 7)) via an example duplexer 814.

In some dual-mode embodiments for Wi-Fi communication, the FEM circuitry 704*a* may be configured to operate in either the 2.4 GHz frequency spectrum or the 5 GHz frequency spectrum. In these embodiments, the receive signal path of the FEM circuitry 704*a* may include a receive signal path duplexer 804 to separate the signals from each spectrum as well as provide a separate LNA 806 for each spectrum as shown. In these embodiments, the transmit signal path of the FEM circuitry 704*a* may also include a power amplifier 810 and a filter 812, such as a BPF, an LPF or another type of filter for each frequency spectrum and a transmit signal path duplexer 804 to provide the signals of one of the different spectrums onto a single transmit path for subsequent transmission by the one or more of the antennas 701 (FIG. 7). In some embodiments, BT communications may utilize the 2.4 GHz signal paths and may utilize the same FEM circuitry 704*a* as the one used for WLAN communications.

Figure 9:
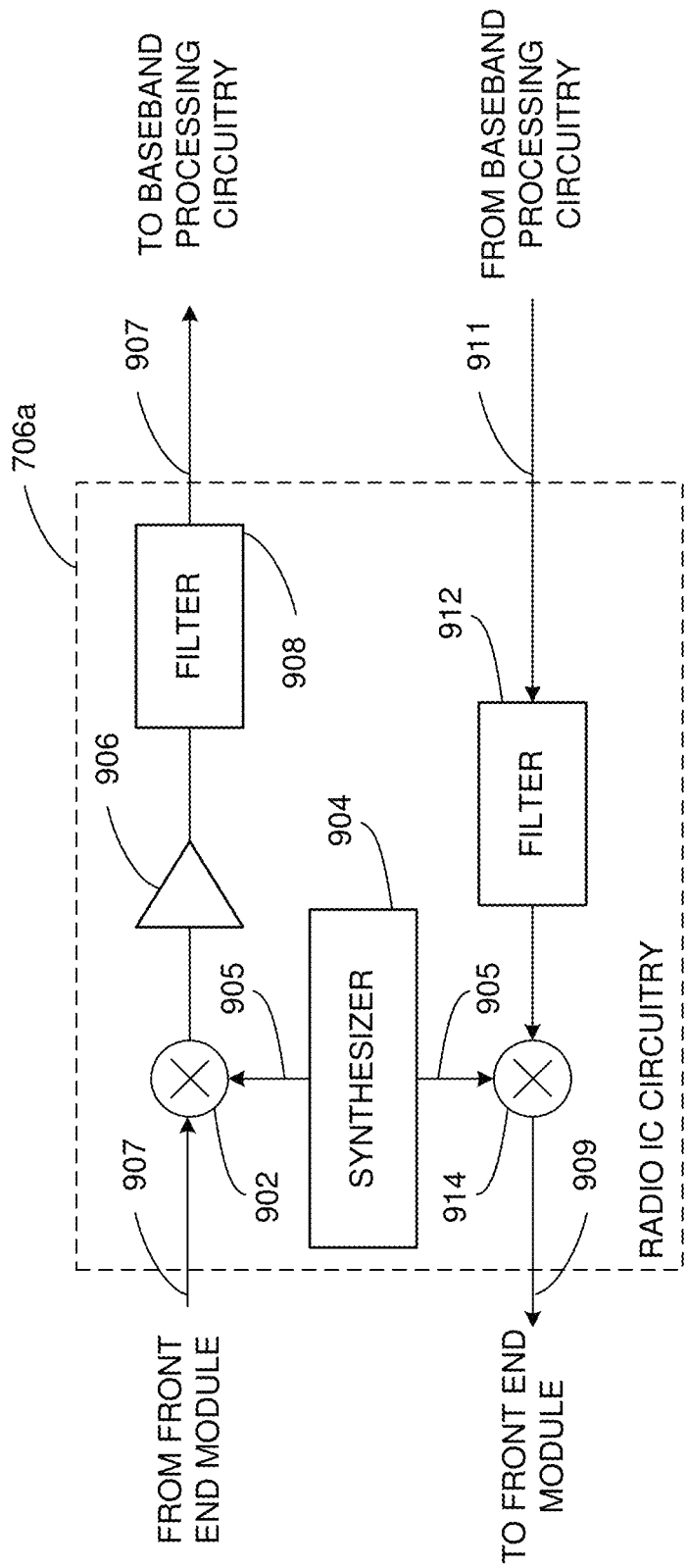
FIG. 9 illustrates an example radio IC circuitry for use in the radio architecture of FIG. 7, in accordance with one or more example embodiments of the present disclosure.

FIG. 9 illustrates radio IC circuitry 706*a* in accordance with some embodiments. The radio IC circuitry 706*a* is one example of circuitry that may be suitable for use as the WLAN or BT radio IC circuitry 706*a*/706*b* (FIG. 7), although other circuitry configurations may also be suitable. Alternatively, the example of FIG. 9 may be described in conjunction with the example BT radio IC circuitry 706*b*.

In some embodiments, the radio IC circuitry 706*a* may include a receive signal path and a transmit signal path. The receive signal path of the radio IC circuitry 706*a* may include at least mixer circuitry 902, such as, for example, down-conversion mixer circuitry, amplifier circuitry 906 and filter circuitry 908. The transmit signal path of the radio IC circuitry 706*a* may include at least filter circuitry 912 and mixer circuitry 914, such as, for example, up-conversion mixer circuitry. Radio IC circuitry 706*a* may also include synthesizer circuitry 904 for synthesizing a frequency 905 for use by the mixer circuitry 902 and the mixer circuitry 914. The mixer circuitry 902 and/or 914 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 9 illustrates only a simplified version of a radio IC circuitry, and may include, although not shown, embodiments where each of the depicted circuitries may include more than one component. For instance, mixer circuitry 914 may each include one or more mixers, and filter circuitries 908 and/or 912 may each include one or more filters, such as one or more BPFs and/or LPFs according to application needs. For example, when mixer circuitries are of the direct-conversion type, they may each include two or more mixers.

In some embodiments, mixer circuitry 902 may be configured to down-convert RF signals 807 received from the FEM circuitry 704a-b (FIG. 7) based on the synthesized frequency 905 provided by synthesizer circuitry 904. The amplifier circuitry 906 may be configured to amplify the down-converted signals and the filter circuitry 908 may include an LPF configured to remove unwanted signals from the down-converted signals to generate output baseband signals 907. Output baseband signals 907 may be provided to the baseband processing circuitry 708a-b (FIG. 7) for further processing. In some embodiments, the output baseband signals 907 may be zero-frequency baseband signals, although this is not a requirement. In some embodiments, mixer circuitry 902 may comprise passive mixers, although the scope of the embodiments is not limited in this respect.

In some embodiments, the mixer circuitry 914 may be configured to up-convert input baseband signals 911 based on the synthesized frequency 905 provided by the synthesizer circuitry 904 to generate RF output signals 809 for the FEM circuitry 704a-b. The baseband signals 911 may be provided by the baseband processing circuitry 708a-b and may be filtered by filter circuitry 912. The filter circuitry 912 may include an LPF or a BPF, although the scope of the embodiments is not limited in this respect.

In some embodiments, the mixer circuitry 902 and the mixer circuitry 914 may each include two or more mixers and may be arranged for quadrature down-conversion and/or up-conversion respectively with the help of synthesizer 904. In some embodiments, the mixer circuitry 902 and the mixer circuitry 914 may each include two or more mixers each configured for image rejection (e.g., Hartley image rejection). In some embodiments, the mixer circuitry 902 and the mixer circuitry 914 may be arranged for direct down-conversion and/or direct up-conversion, respectively. In some embodiments, the mixer circuitry 902 and the mixer circuitry 914 may be configured for super-heterodyne operation, although this is not a requirement.

Mixer circuitry 902 may comprise, according to one embodiment: quadrature passive mixers (e.g., for the in-phase (I) and quadrature phase (Q) paths). In such an embodiment, RF input signal 807 from FIG. 9 may be down-converted to provide I and Q baseband output signals to be sent to the baseband processor Quadrature passive mixers may be driven by zero and ninety-degree time-varying LO switching signals provided by a quadrature circuitry which may be configured to receive a LO frequency (fLO) from a local oscillator or a synthesizer, such as LO frequency 905 of synthesizer 904 (FIG. 9). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have an 85% duty cycle and an 80% offset. In some embodiments, each branch of the mixer circuitry (e.g., the in-phase (I) and quadrature phase (Q) path) may operate at an 80% duty cycle, which may result in a significant reduction is power consumption.

The RF input signal 807 (FIG. 8) may comprise a balanced signal, although the scope of the embodiments is not limited in this respect. The I and Q baseband output signals may be provided to low-noise amplifier, such as amplifier circuitry 906 (FIG. 9) or to filter circuitry 908 (FIG. 9).

In some embodiments, the output baseband signals 907 and the input baseband signals 911 may be analog baseband signals, although the scope of the embodiments is not limited in this respect. In some alternate embodiments, the output baseband signals 907 and the input baseband signals 911 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 904 may be a fractional-N synthesizer or a fractional N/N+1 synthesizer, although the scope of the embodiments is not limited in this respect as other types of frequency synthesizers may be suitable. For example, synthesizer circuitry 904 may be a delta-sigma synthesizer, a frequency multiplier, or a synthesizer comprising a phase-locked loop with a frequency divider. According to some embodiments, the synthesizer circuitry 904 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 904 may be provided by a voltage controlled oscillator (VCO), although that is not a requirement. A divider control input may further be provided by either the baseband processing circuitry 708a-b (FIG. 7) depending on the desired output frequency 905. In some embodiments, a divider control input (e.g., N) may be determined from a look-up table (e.g., within a Wi-Fi card) based on a channel number and a channel center frequency as determined or indicated by the example application processor 710. The application processor 710 may include, or otherwise be connected to, one of the example secure signal converter 101 or the example received signal converter 103 (e.g., depending on which device the example radio architecture is implemented in).

In some embodiments, synthesizer circuitry 904 may be configured to generate a carrier frequency as the output frequency 905, while in other embodiments, the output frequency 905 may be a fraction of the carrier frequency (e.g., one-half the carrier frequency, one-third the carrier frequency). In some embodiments, the output frequency 905 may be a LO frequency (fLO).

Figure 10:
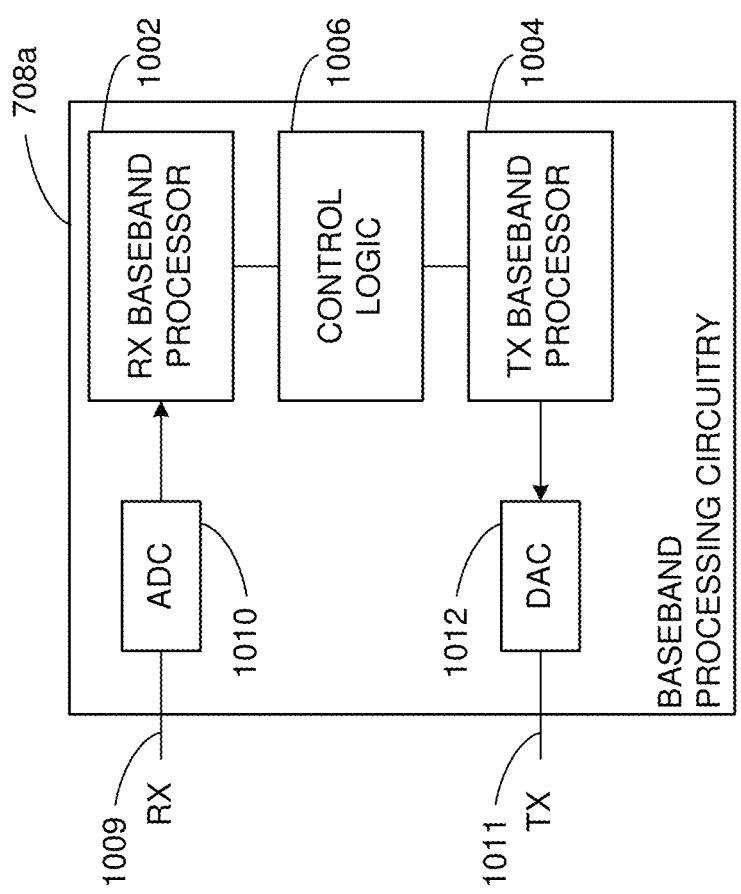
FIG. 10 illustrates an example baseband processing circuitry for use in the radio architecture of FIG. 7, in accordance with one or more example embodiments of the present disclosure.

FIG. 10 illustrates a functional block diagram of baseband processing circuitry 708a in accordance with some embodiments. The baseband processing circuitry 708a is one example of circuitry that may be suitable for use as the baseband processing circuitry 708a (FIG. 7), although other circuitry configurations may also be suitable. Alternatively, the example of FIG. 9 may be used to implement the example BT baseband processing circuitry 708b of FIG. 7.

The baseband processing circuitry 708a may include a receive baseband processor (RX BBP) 1002 for processing receive baseband signals 909 provided by the radio IC circuitry 706a-b (FIG. 7) and a transmit baseband processor (TX BBP) 1004 for generating transmit baseband signals 911 for the radio IC circuitry 706a-b. The baseband processing circuitry 708a may also include control logic 1006 for coordinating the operations of the baseband processing circuitry 708a.

In some embodiments (e.g., when analog baseband signals are exchanged between the baseband processing circuitry 708a-b and the radio IC circuitry 706a-b), the baseband processing circuitry 708a may include ADC 1010 to convert analog baseband signals 1009 received from the radio IC circuitry 706a-b to digital baseband signals for processing by the RX BBP 1002. In these embodiments, the baseband processing circuitry 708a may also include DAC 1012 to convert digital baseband signals from the TX BBP 1004 to analog baseband signals 1011.

In some embodiments that communicate OFDM signals or OFDMA signals, such as through baseband processor 708a, the transmit baseband processor 1004 may be configured to generate OFDM or OFDMA signals as appropriate for transmission by performing an inverse fast Fourier transform (IFFT). The receive baseband processor 1002 may be configured to process received OFDM signals or OFDMA signals by performing an FFT. In some embodiments, the receive baseband processor 1002 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 7, in some embodiments, the antennas 701 (FIG. 7) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 701 may each include a set of phased-array antennas, although embodiments are not so limited.

Although the radio architecture 105A, 105B is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

What is claimed is:

1. A device, the device comprising processing circuitry coupled to storage, the processing circuitry configured to:
    calculate a first integrity code using an integrity group temporal key, wherein the integrity code is used for a protected beacon frame;
    generate the protected beacon frame, wherein the protected beacon frame comprises a beacon frame body;
    include the integrity group temporal key in a beacon management element of the beacon frame body of the protected beacon frame;
    determine an information element (IE) comprising a beacon integrity number indicating a beacon count based on received beacons from associated devices;
    assign a beacon number to the protected beacon frame, the beacon number being derived from a multiple basic service set (MultiBSS) beacon number acting as a counter shared by multiple virtual APs of a multiple basic service set identification (BSSID) set; and
    cause to send the protected beacon frame to a first station device.

2. The device of claim 1, wherein the integrity group temporal key is included in the beacon frame body for the first station device to calculate a second integrity code using the integrity group temporal key.

3. The device of claim 2, wherein the first integrity code and the second integrity code being the same indicates to the first station device that the protected beacon frame is not compromised.

4. The device of claim 2, wherein a mismatch between the first integrity code and the second integrity code indicates to the first station device that the protected beacon frame is compromised and to be discarded.

5. The device of claim 2, wherein a mismatch between the first integrity code and the second integrity code indicates to the first station device to increment a replay counter.

6. The device of claim 1, wherein the beacon number indicates to the first station device to compare the beacon number to a counter value and if the first station device determines that the beacon number is less than or equal to the counter value, the first station device discards the protected beacon frame.

7. The device of claim 1, further comprising a transceiver configured to transmit and receive wireless signals.

8. The device of claim 7, further comprising an antenna coupled to the transceiver to cause to send the protected beacon frame.

9. A non-transitory computer-readable medium storing computer-executable instructions which when executed by one or more processors result in performing operations comprising:
    calculating a first integrity code using an integrity group temporal key, wherein the integrity code is used for a protected beacon frame;
    generating the protected beacon frame, wherein the protected beacon frame comprises a beacon frame body;
    including the integrity group temporal key in a beacon management element of the beacon frame body of the protected beacon frame;
    determining an information element (IE) comprising a beacon integrity number indicating a beacon count based on received beacons from associated devices;
    assigning a beacon number to the protected beacon frame, the beacon number being derived from a multiple basic service set (MultiBSS) beacon number acting as a counter shared by multiple virtual APs of a multiple basic service set identification (BSSID) set; and
    causing to send the protected beacon frame to a first station device.

10. The non-transitory computer-readable medium of claim 9, wherein the integrity group temporal key is included in the beacon frame body for the first station device to calculate a second integrity code using the integrity group temporal key.

11. The non-transitory computer-readable medium of claim 10, wherein the first integrity code and the second integrity code being the same indicates to the first station device that the protected beacon frame is not compromised.

12. The non-transitory computer-readable medium of claim 10, wherein a mismatch between the first integrity code and the second integrity code indicates to the first station device that the protected beacon frame is compromised and to be discarded.

13. The non-transitory computer-readable medium of claim 10, wherein a mismatch between the first integrity code and the second integrity code indicates to the first station device to increment a replay counter.

14. The non-transitory computer-readable medium of claim 9, wherein the beacon number indicates to the first station device to compare the beacon number to a counter value and if the first station device determines that the beacon number is less than or equal to the counter value, the first station device discards the protected beacon frame.

15. A method comprising:
calculating, by one or more processors, a first integrity code using an integrity group temporal key, wherein the integrity code is used for a protected beacon frame;
generating the protected beacon frame, wherein the protected beacon frame comprises a beacon frame body;
including the integrity group temporal key in a beacon management element of the beacon frame body of the protected beacon frame;
determining an information element (IE) comprising a beacon integrity number indicating a beacon count based on received beacons from associated devices;
assigning a beacon number to the protected beacon frame, the beacon number being derived from a multiple basic service set (MultiBSS) beacon number acting as a counter shared by multiple virtual APs of a multiple basic service set identification (BSSID) set; and
causing to send the protected beacon frame to a first station device.

16. The method of claim 15, wherein the integrity group temporal key is included in the beacon frame body for the first station device to calculate a second integrity code using the integrity group temporal key.

17. The method of claim 16, wherein the first integrity code and the second integrity code being the same indicates to the first station device that the protected beacon frame is not compromised.

* * * * *